United States Patent [19]

Gabiniewicz et al.

[11] Patent Number: 5,627,767
[45] Date of Patent: May 6, 1997

[54] TESTING DEVICE FOR MANUALLY MOVABLE COMPONENTS OF A MOTOR VEHICLE

[75] Inventors: Joseph V. Gabiniewicz, Novi; Guenther Braeuner; Galus Chelaidite, both of Farmington Hills; Zbigniew A. Paluch, Northville; Haydn W. C. Yik, Walled Lake, all of Mich.

[73] Assignee: Atoma International, Inc., Ontario, Canada

[21] Appl. No.: 393,989

[22] Filed: Feb. 24, 1995

[51] Int. Cl.⁶ ........................................ G01L 5/22
[52] U.S. Cl. ................... 364/552; 364/424.034; 364/424.04; 364/425
[58] Field of Search ................ 49/360, 280, 139; 70/277, 279; 292/336.3, 214; 318/560, 628, 671, 685; 244/223; 296/146.1; 364/424.01, 424.03, 424.04, 424.05, 425, 512, 552, 560, 566, 578

[56] References Cited

U.S. PATENT DOCUMENTS

| | | |
|---|---|---|
| 3,575,046 | 4/1971 | Shattles et al. . |
| 3,882,489 | 5/1975 | Guggolz . |
| 4,206,636 | 6/1980 | Hendrix . |
| 4,373,402 | 2/1983 | Barrett ........................... 73/121 |
| 4,380,171 | 4/1983 | Smith . |
| 4,439,824 | 3/1984 | Mayer . |
| 4,499,759 | 2/1985 | Hull ............................... 73/146 |
| 4,513,235 | 4/1985 | Acklam et al. ................. 318/685 |
| 4,768,391 | 9/1988 | Hayes . |
| 4,794,801 | 1/1989 | Andrews et al. . |
| 4,989,459 | 2/1991 | Faber, Jr. . |
| 5,044,956 | 9/1991 | Behensky et al. ............. 434/45 |
| 5,063,710 | 11/1991 | Schap ............................ 49/280 |
| 5,069,000 | 12/1991 | Zuckerman .................... 49/28 |
| 5,195,381 | 3/1993 | Keibler . |
| 5,261,291 | 11/1993 | Schoch . |
| 5,388,467 | 2/1995 | Jereb et al. . |

FOREIGN PATENT DOCUMENTS 2252826   8/1992   United Kingdom .

*Primary Examiner*—Emanuel T. Voeltz
*Assistant Examiner*—Craig Steven Miller
*Attorney, Agent, or Firm*—Cushman Darby Cushman Intellectual Property Group of Pillsbury Madison Sutro LLP

[57] ABSTRACT

An apparatus is provided for acquiring data relating to an amount of force required to move a manually movable member operatively associated with a motor vehicle through a predetermined range of movement. The apparatus comprises a movable assembly constructed and arranged to be able to engage the manually movable member through the predetermined range of movement of the manually movable member. A drive mechanism is constructed and arranged to drive the movable assembly so that the movable assembly applies a force to the manually movable member and moves the manually movable member through the predetermined range of movement so as to generally simulate a predetermined manual movement of the manually movable member. Circuitry is operatively connected with the movable assembly for generating electrical signals indicative of the force applied to the manually movable member by the movable assembly during the predetermined simulated manual movement of the manually movable member through the predetermined range of movement. A data processing system is responsive to the electrical signals generated by the circuitry for generating data indicative of the force applied by the movable assembly to the manually movable member during the predetermined simulated manual movement of the manually movable member through the predetermined range of movement.

52 Claims, 17 Drawing Sheets

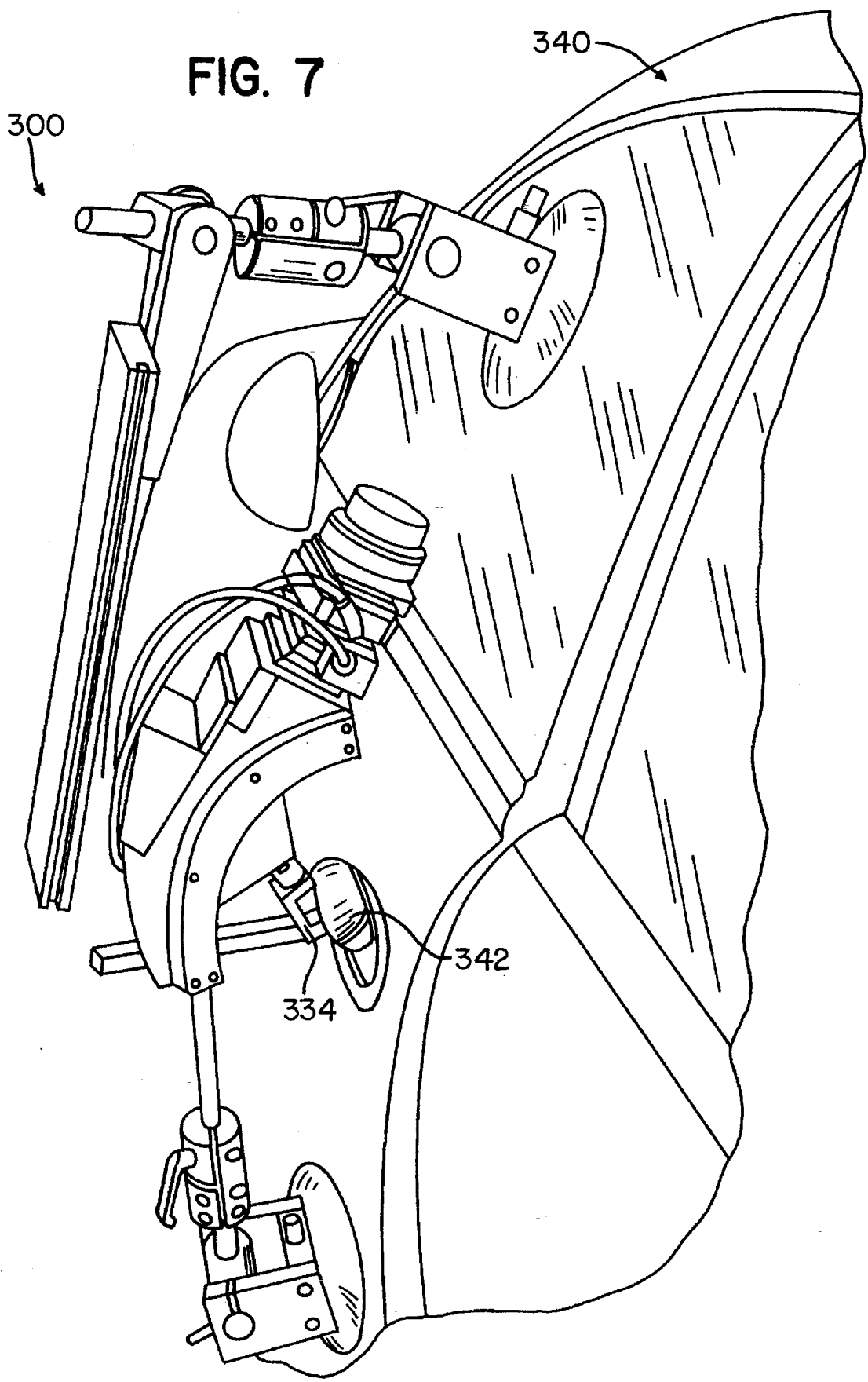

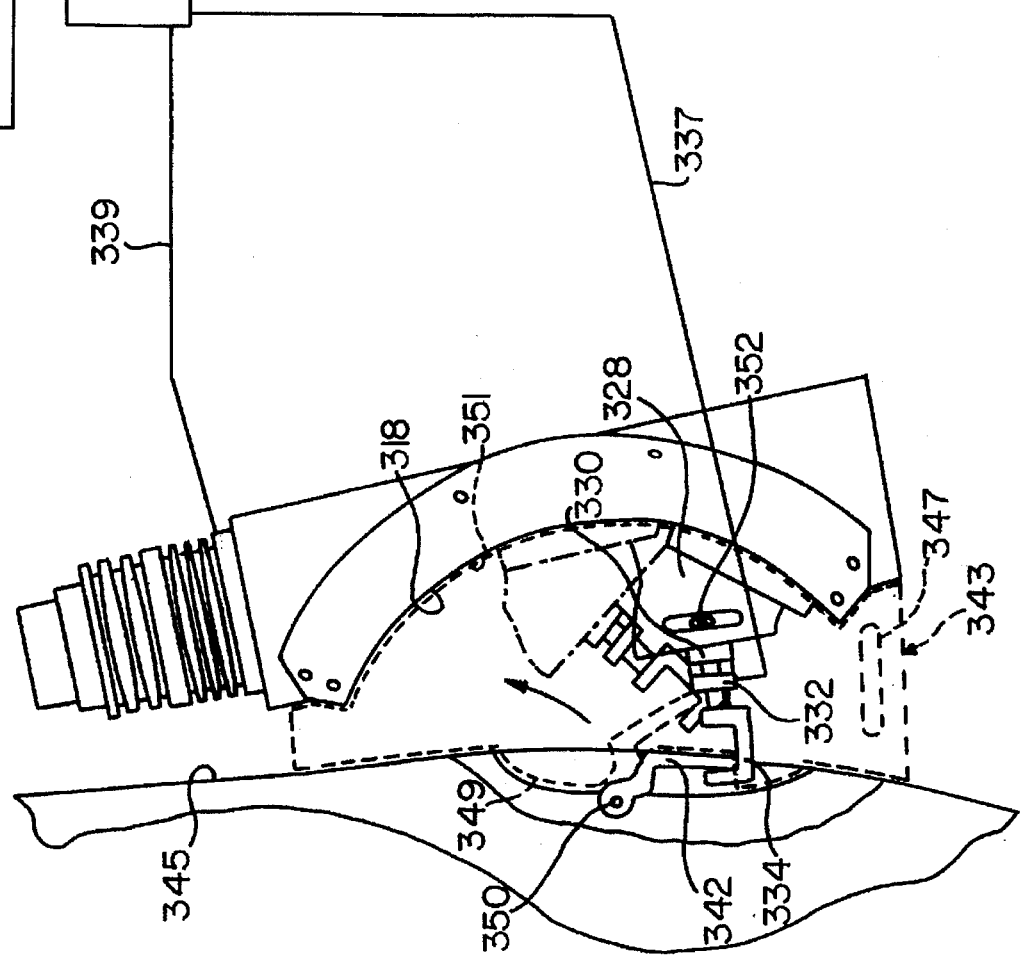

TESTING DEVICE FOR MANUALLY MOVABLE COMPONENTS OF A MOTOR VEHICLE

BACKGROUND OF THE INVENTION

The present invention relates to testing devices for motor vehicles, and more particularly, to testing devices which are capable of acquiring data relating to an amount of force required to move a manually movable member operatively associated with a motor vehicle.

In the automotive industry, manufacturers are constantly striving to enhance the comfort and ergonomics of motor vehicles. Substantial measures are taken to provide comfortable seating and to position various components, such as the steering wheel, seat belts, seat reclining mechanism, radio, mirror adjustment, window adjustment, door handle, and other components which are operated during ordinary use of a motor vehicle.

In more recent years, even further steps have been taken to make the motor vehicle with optimal ergonomic characteristics. For example, motor vehicle manufacturers are now in the practice of measuring the resistive forces associated with operating one or more manually movable vehicle components. More specifically, several manufacturers utilize a hand-held, peak load electronic scale for measuring the peak load or peak force associated with pivoting a spring biased exterior door handle of the motor vehicle. The purpose of obtaining such information is to enable the motor vehicle manufactures to characterize the force expended during manual operation of such manually movable components and to ascertain whether the force expended falls within a certain range.

The conventional hand-held device is typically provided with a handle engagement member, substantially in the form of a hook for catching the vehicle door handle, and a main housing, which houses circuitry for obtaining a peak load reading. Such hand-held devices are available from John Chatillon & Sons Inc., of Kew Gardens, N.Y. (see U.S. Pat. No. 3,882,489 for a disclosure of the type of circuitry which may be used in such hand-held devices). In use, an operator holding the hand-held device housing engages the hook-like engagement member and pulls the device housing in an appropriate manner to cause the engagement member to forcibly pivot the vehicle door housing about its axis.

A number of problems are associated with the aforementioned hand-held device. For example, because the device is manually operated, the obtained results are not repeatable with an acceptable degree of accuracy. More specifically, in use, the hand-held device may be manually pulled at different angles, through different ranges of movement, and at different speeds, which may all effect the peak load reading. In addition, even if an accurate force measurement is taken, the acquired data only corresponds to a peak load measurement, and does not provide a measurement that characterizes the force utilized in moving the manually movable handle throughout the range of movement. Obtaining force measurements characterizing the force required to move various manually movable members through a full range of movement would provide information that can be useful in engineering and designing the various linkages or elements which have an effect on the forces associated with moving such manually movable members throughout said full range of movement. There is therefore a need for an apparatus that will provide more accurate and repeatable measurements and will more fully characterize the force utilized in moving a manually movable member of a motor vehicle through its full range of movement.

It is therefore an object of the present invention to fulfill the need expressed above. In accordance with the principles of the present invention, this objective is achieved by providing an apparatus for acquiring data relating to an amount of force required to move a manually movable member operatively associated with a motor vehicle through a predetermined range of movement. The apparatus includes a movable assembly constructed and arranged to be able to engage the manually movable member through the predetermined range of movement of the manually movable member. A drive mechanism is constructed and arranged to drive the movable assembly so that the movable assembly applies a force to the manually movable member and moves the manually movable member through the predetermined range of movement so as to generally simulate a predetermined manual movement of the manually movable member. Circuitry is operatively connected with the movable assembly for generating electrical signals indicative of the force applied to the manually movable member by the movable assembly during the predetermined simulated manual movement of the manually movable member through the predetermined range of movement. In addition, a data processing system is responsive to the electrical signals generated by the circuitry for generating data indicative of the force applied by the movable assembly to the manually movable member during the predetermined simulated manual movement of the manually movable member through the predetermined range of movement.

In two embodiments, the apparatus includes a movable assembly constructed and arranged to engage a manually movable member in the form of a spring biased motor vehicle door handle and to move the vehicle door handle against the bias thereof.

In another embodiment, the apparatus includes a movable assembly constructed and arranged to engage a manually movable in the form of a key which is disposed to be inserted into an associated motor vehicle key cylinder against the frictional engagement between the key and the associated key cylinder.

In another embodiment, the apparatus includes a movable assembly constructed and arranged to engage a manually movable in the form of a key disposed within an associated motor vehicle key cylinder and rotatable against the yieldable resistance of the key cylinder.

In another embodiment, the apparatus includes a movable assembly constructed and arranged to engage a manually movable in the form of a motor vehicle inside door lock knob.

In another embodiment, the apparatus includes a movable assembly constructed and arranged to engage a manually movable in the form of a rotatable vehicle window handle.

In three other embodiments, the apparatus includes a movable assembly constructed and arranged to engage a manually movable in the form of a motor vehicle door.

It is a further object of the present invention to provide a method by which the force utilized in moving a manually movable member of a motor vehicle can be more fully characterized by comprehensive data indicative of the force utilized in moving the manually movable member throughout a predetermined range of normal manual movement. To accomplish this object, the present invention provides a method for acquiring data relating to an amount of force utilized in moving a manually movable member operatively associated with a motor vehicle throughout a predetermined range of normal manual movement of the manually movable member comprising. The method comprises moving the manually movable member through the predetermined range of normal manual movement; generating a progression of electrical signals based on an amount of force utilized in moving the manually movable member through the predetermined range of normal manual movement; and processing the progression of electrical signals to derive data indicative of the amount of force utilized in moving the manually movable member throughout the predetermined range of normal manual movement.

These and other objects of the present invention will become apparent from the following detailed description, taken in conjunction with the accompanying drawings, which illustrate, by way of example, several embodiments of the principles in accordance with the present invention.

DETAILED DESCRIPTION OF THE DRAWINGS

FIG. 7 is a perspective view of the door handle testing module of the fifth embodiment of the apparatus in accordance with the principles of the present invention, shown mounted on a motor vehicle.

FIG. 8 is a side plan view showing the door handle testing module manufactured in accordance with the fifth embodiment of the present invention.

FIG. 9 is a perspective view showing an adaptor used for a door handle testing module corresponding to a sixth embodiment of an apparatus manufactured in accordance with the principles of the present invention.

FIGS. 16a–16d constitute a flow diagram outlining the data processing system logic for the apparatus in accordance with the principles of the present invention.

Figure 1:
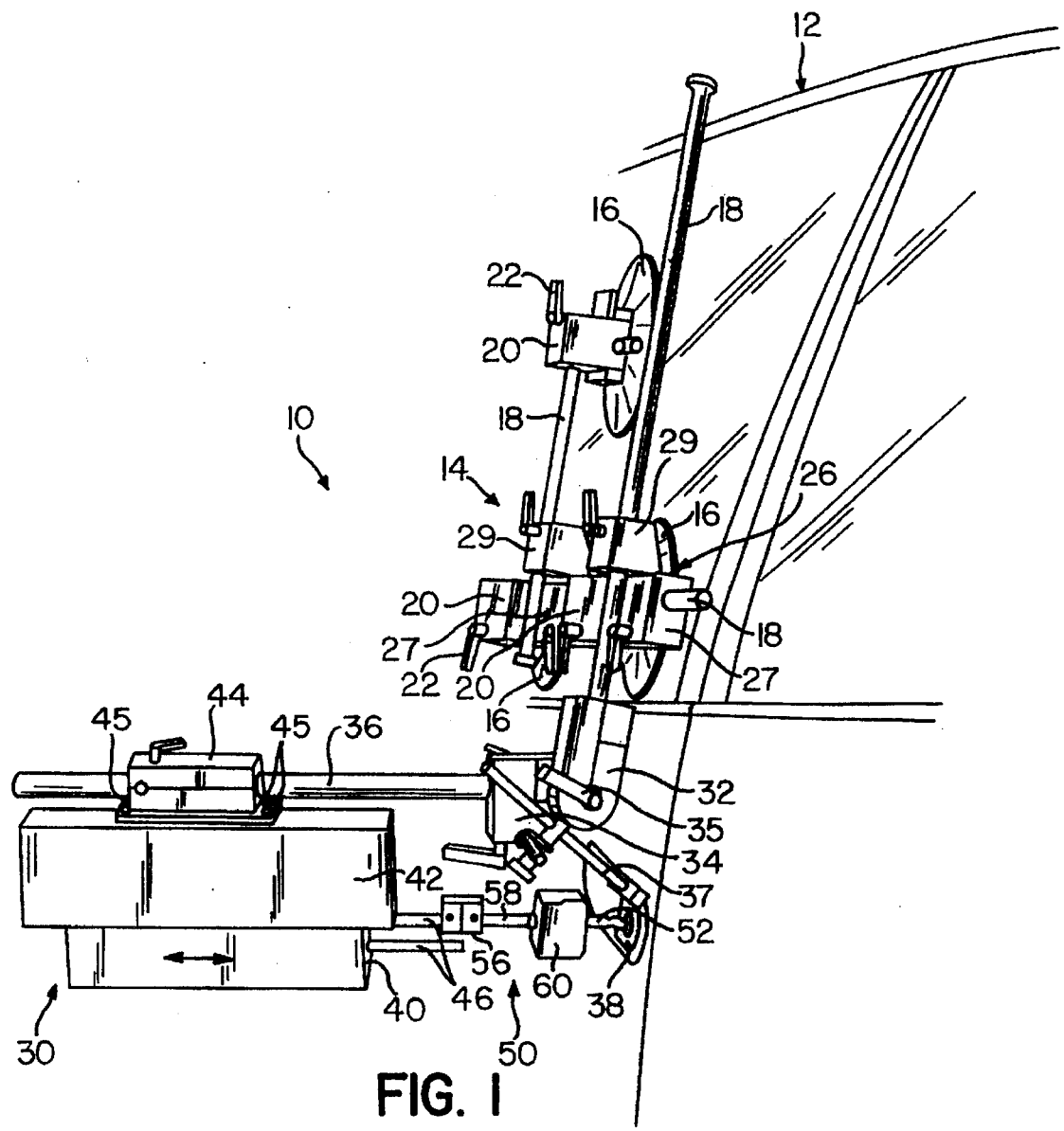
FIG. 1 is a perspective view showing a key insertion testing module corresponding to a first embodiment of an apparatus manufactured in accordance with the principles of the present invention.

Shown generally in FIG. 1 is a module 10, in the form of a key insertion testing module, manufactured in accordance with the principles of the present invention. As shown, the module 10 is mounted on the exterior of a motor vehicle 12 via a mounting assembly, generally indicated at 14. The mounting assembly includes a plurality of mounting elements, in the form of suction cups 16, for securing the mounting assembly 14 to the motor vehicle. The mounting assembly 14 further includes a plurality of mounting arms or support rods 18, and a plurality of suction cup mounting blocks 20 (three of each shown in FIG. 1). The mounting blocks 20 are each rigidly connected with a respective suction cup 16 and receive the support rods 18 therethrough. The blocks 20 are provided with tightening levers 22 for fixing the support rods in a desired relation with respect to the suction cups 16. The mounting assembly 14 further includes T-mounting blocks, generally indicated at 26, each having a first rod receiving member 27 for receiving a horizontally disposed support rod 18, and a second rod receiving member 29 for receiving a vertically disposed support rod 18. The T-mounting blocks 26 enable the vertically extending support rods 18 to be rigidly fixed with respect to the horizontally extending support rod.

A movable assembly, generally indicated at 30, is motor driven, and preferably incorporates a single axis positioning table, such as those available from New England Affiliated Technologies, Lawrence, Mass. (RM Series). The movable assembly 30 is connected with respect to the mounting assembly 14. More specifically, as shown, a lower mounting block 32 is connected with one of the vertically extending support rods 18 and is pivotally connected with an adjacent mounting block 34. A tightening lever 35 may be tightened to fixed the relative pivotal positions of the mounting blocks 32 and 34. The mounting block 34 receives one end of a support rod 36, extending outwardly away from the vehicle 12. A stabilization bar 37 is pivotally connected with the mounting block 34 and serves as additional enforcement for maintaining the support bar 36 in a substantially horizontal condition against the torque applied by the weight of movable assembly 30 on support rod 36.

The mounting assembly 14 is arranged and mounted on the motor vehicle 12 in such a fashion that the support rod 36, which extends from the lower portion of the mounting assembly, is in substantial alignment with a door key cylinder 38 associated with the motor vehicle 12.

The movable assembly 30 includes a movable element 40 mounted for movement with respect to a fixed base 42, which is fixed relative to the support rod 36 via mounting block 44, rigidly connected with the movable assembly 30 by appropriate fasteners 45.

The movable element 40 carries a pair of forwardly extending mounting bars 46, having substantially equal lengths and being disposed and parallel to one another. The movable element 40 further includes an adaptor element, which is constructed and arranged to engage a manually movable member operatively associated with the motor vehicle. More specifically, in the embodiment shown in FIG. 1, a key adaptor element 50 is constructed and arranged to engage a manually movable member in the form of a key 52 capable of being inserted into the associated key cylinder 38. The key adaptor element 50 includes a conversion member 56, an extension bar 58, and a key holder 60. The key adaptor element 50 is formed as part of the movable element 40, and hence the movable assembly 30, via conversion member 56, which connects the end of an upper one of the mounting bars 46 to an adjacent end of the extension bar 58. The opposite end of the extension bar 58 is rigidly connected with the key holder 60.

In FIG. 1, the key insertion module 10 is shown in a condition in which it is prepared to perform a data acquisition operation for measuring the amount of force required to move the manually movable member in the form of key 52 through a predetermined range of movement. The preferred predetermined range of movement in the present embodiment extends from the position shown in FIGURE 1, wherein the key is disposed substantially externally to the associate key cylinder, to a position in which the key has been inserted into the associated key cylinder (e.g., to a position wherein the key is capable of being turned in relation to the cylinder 38 to lock or unlock the associated vehicle door 64). The movement of the key through the aforementioned range of movement is intended to simulate a typical manual insertion of the key 52 into the associated cylinder 38 against the frictional engagement of the key 52 with the inner confines of the cylinder 38. To make this simulated movement more life-like, the key 52 is engaged by the key holder 60 in such fashion as to permit limited movement of said key slightly out of alignment with the key passage in the key cylinder as the key is moved against the frictional engagement of key cylinder.

Figure 2:
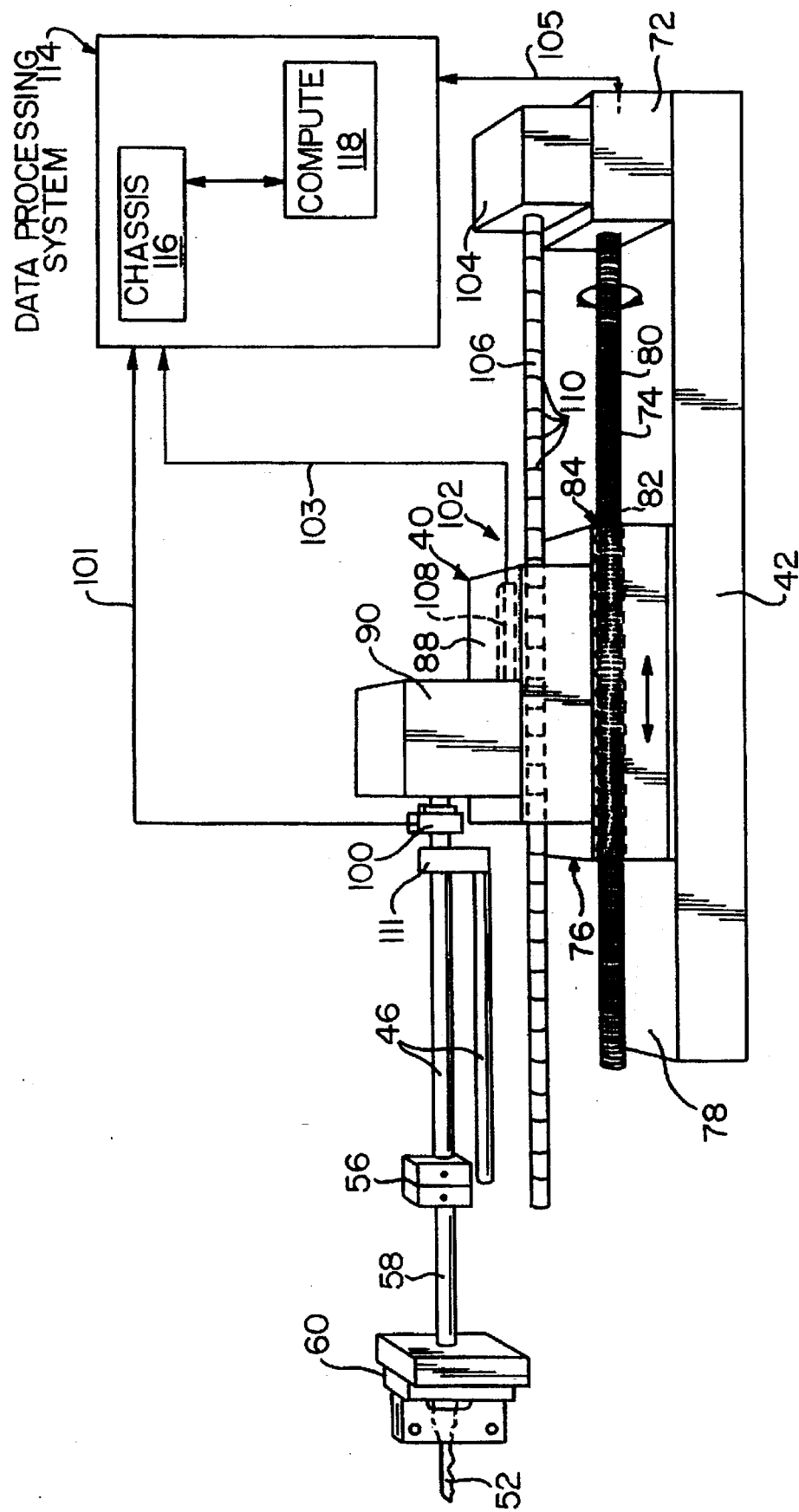
FIG. 2 is a schematic view showing the key insertion testing module of FIG. 1 in accordance with the first embodiment of the present invention.

FIG. 2 is a schematic representation of the movable assembly 30 of FIG. 1. In FIG. 2, a drive mechanism, in the form of a motor 72, is used to drive the movable element 40 relative to the fixed base 42. While the motor 72 and its peripheral components (e.g., drive shaft 74) may be considered to form part of the movable assembly, and is typically provided with the aforementioned positioning table which forms part of the movable assembly, the motor 72 can also be considered to be a drive mechanism separate from the movable assembly.

The motor 72 is adapted to drive the movable assembly 30 to apply a force to the key 52 and move the key against the frictional resistance provided by the inner confines of key cylinder 38 through the predetermined range of movement. More particularly, the motor 72 is coupled with a drive shaft 74, and rotates the drive shaft 74 about its axis. The drive shaft 74 is provided with threads 80 adapted to cooperate with associate threads 82 provided in a surface defining a bore 84 through a movable mount, generally indicated at 76. Rotation of the drive shaft 74 effectuates either forward or rearward movement, depending upon the direction of shaft rotation, of movable mount 76 along a bearing surface 78.

Fixed to movable mount 76 is a first mounting assembly 88, upon which a second mounting assembly 90 is fixed. The circuitry which generates electrical signals indicative of the force applied to the key during key insertion includes a transducer, preferably a load cell 100, disposed between the second mounting assembly 90 and the mounting bars 46. As shown the mounting bars 46 are connected to one another at one end by a rigid metallic mounting plate 111, which in turn is operatively connected with the load cell 100. The load cell 100 is conventional, and is available from Sensotec, Inc. of Columbus, Ohio (e.g., Models 31 and 34). The load cell 100 is sensitive to tension and/or compression load forces, and generates a voltage proportional thereto. The voltage is sent as a signal, through electrical carrier 101, to a data processing system 114, which includes a chassis 116, and a computer which receives an amplified load cell signal from the chassis. The load cell 100 generates signals as a function of the amount of forced applied by the movable assembly 30 to the key 52 throughout the range of movement of the key.

While the amount of force can be analyzed by the data processing system 114 as a function of time, it is preferred that the force be analyzed as a function of the distance travelled by the movable assembly 30, and hence the key 52, through the range of movement. More specifically, the apparatus of the present invention preferably includes an encoder, generally indicated at 102, which includes a fixed mounting element 104, for fixedly carrying an indexing rod 106, and a reading head 108 mounted for movement with the mounting assembly 88. The indexing rod 106 is preferably made of glass and has a plurality of non-transparent indicia 110 disposed along a length thereof. The encoder is conventional and functions such that the reading head 108 sends a signal, via electrical carrier 103, to the data processing system 114 to provide an indication as to the distance travelled by the reading head as determined by the number of indicia 110 sensed by the reading head 108.

During operation, it can be appreciated that when the motor 72 receives an appropriate signal from the data processing system 114 via electrical carrier 105, the drive shaft 74 may be rotated to move movable mount 76 forwardly upon bearing surface 78. This movement causes forward movement of key 52 so that the key will be inserted into the associated key cylinder 38. During this insertion, the amount of force encountered by the movable assemble (e.g., the key holder 60) as a result of the frictional engagement between the key 52 and the associated key cylinder 38 will be measured by the load cell 100 throughout the range of movement. At the same time, forward movement of the movable mount 76 will cause the reading head 108 of the encoder 102 to provide signals to the data processing system 114 indicative of the distance travelled by the key 52. The data processing system 114 can then accurately provide data indicative of the amount of force required to insert the key 52 into the associated cylinder 38 throughout the various stages of key insertion.

Preferably, the data processing system 114 includes a comparator (not shown), which compares the voltage output of the load cell 100 to a predetermined voltage, and will continue to operate the motor 72 until such predetermined load cell voltage is detected. Once the predetermined load cell voltage is detected by the comparator, the data processing system 114 shuts off motor 72. The predetermined voltage can be input into the computer 118, and is ideally set such that the voltage signal from the load cell 100 will exceed the predetermined voltage only when the key 52 has been completely inserted into the associated cylinder 38, so that continued forward movement of the key 52 and key holder 60 causes a significantly large load to be applied to the load cell 100.

Figure 3:
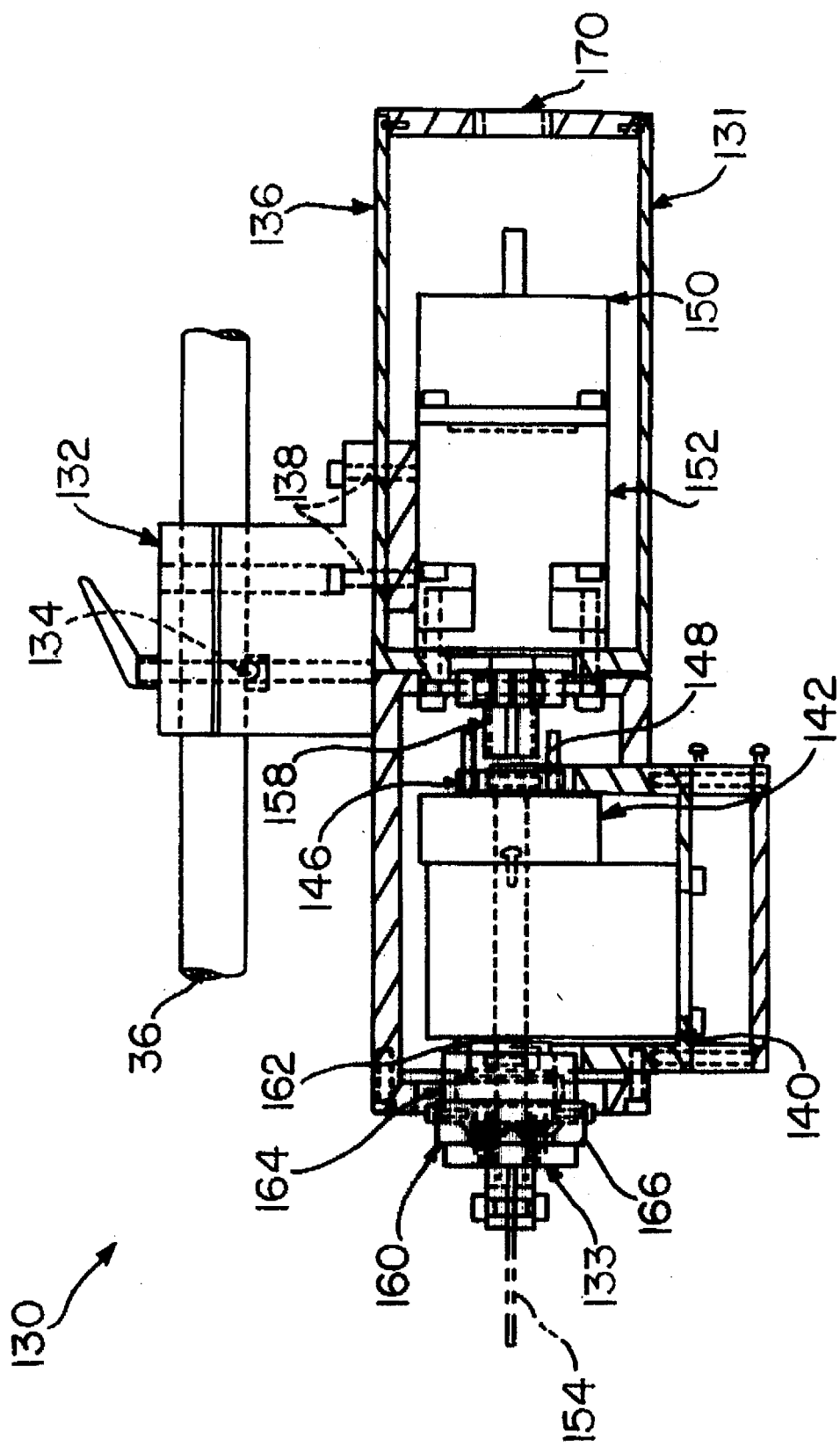
FIG. 3 is a side plan view, with certain portions shown in section to better reveal others, showing a key turning testing module corresponding to a second embodiment of an apparatus manufactured in accordance with the principles of the present invention.

FIG. 3 shows a second embodiment in accordance with the principles of the present invention. More specifically, FIG. 3 generally shows a movable assembly 130 of a key turning module, which forms part of an apparatus adapted to generate data indicative of the amount of force required to turn a key against the yieldable resistance of an associated key cylinder. The movable assembly 130 includes a fixed base, generally indicated at 131, a movable element 133, and is adapted to be connected with the mounting assembly 14 shown in FIG. 1. In particular, the movable assembly 130 includes a shaft clamping block 132, which is similar to mounting block 44 in the embodiment shown in FIG. 1. Mounting block 132 slidably receives support rod 36 and is then clamped in place by a conventional ball plunger assembly 134. The fixed base 131 of movable assembly 130 includes an exterior housing 136, which is secured to the shaft clamping block 132 by appropriate fasteners 138. Disposed within the exterior housing 136 is a transducer, in the form of a torque cell 140, which is conventional. An exemplary torque cell used in this embodiment is available from Cooper Instruments, Warrenton, Va. (Model No. 01224-310). The movable assembly 130 further includes an encoder 142, which is also conventional, and available from Danaher Controls (Series M20). The encoder 142 is adapted to receive translational rotation via a coupling 146 having a pair of spaced pins 148. A step motor 150 and a transmission device 152 are provided for rotatably driving the encoder 142, the torque cell 140, and eventually the key 154, which is to be rotated after being inserted into an associated key cylinder. More particularly, the step motor 150 and transmission device 152, which are both available from Applied Motion Products of Watsonville, Calif. (e.g., Motor Series No. 5023, and Step Motor Driver Model No. PD2035), are arranged such that operation thereof causes rotation of a fin coupler 158, which extends between the coupling pins 148, and is sized to rotationally engage said pins 148 to drive the encoder 142, torque cell 140 and key 154.

The key 154 is connected for rotational movement with the torque cell 140 via a movable assembly 133, in the form of a rotatable mounting assembly 160. The mounting assembly includes a spur gear coupler 162, a ring gear coupler 164, a key center adjuster 166, and a key clamping assembly 168.

A rearward opening 170 is provided in the exterior housing 136 for receiving electrical wiring (not shown) that provides electric power to the movable assembly 130.

In operation, the movable assembly 130 engages the key 154 and is driven by the step motor 150 to be able to rotatably move the key 154, when the key is disposed within the associated key cylinder, from a first position (i.e., wherein the associated vehicle door is locked) to a second position (e.g., wherein the associated vehicle door is unlocked) against the yieldable resistance of the cylinder. The encoder 142 and transducer or torque cell 140 send signals to a data processing system (not shown in FIG. 3), which generates data indicative of the amount of force applied by the movable assembly 130 to key 154 as a function of the distance travelled (i.e., angular distance), as measured by the encoder 142, by the key 154.

While the apparatus of the first two embodiments (FIGS. 1–3) have been shown and described in conjunction with the key cylinder for the motor vehicle door, it can be appreciated that the apparatus in accordance with the principles of the present invention can be appropriately mounted so as to be adapted for use in conjunction with other key cylinders carried by a motor vehicle, such as the vehicle ignition and the rear trunk.

Figure 4:
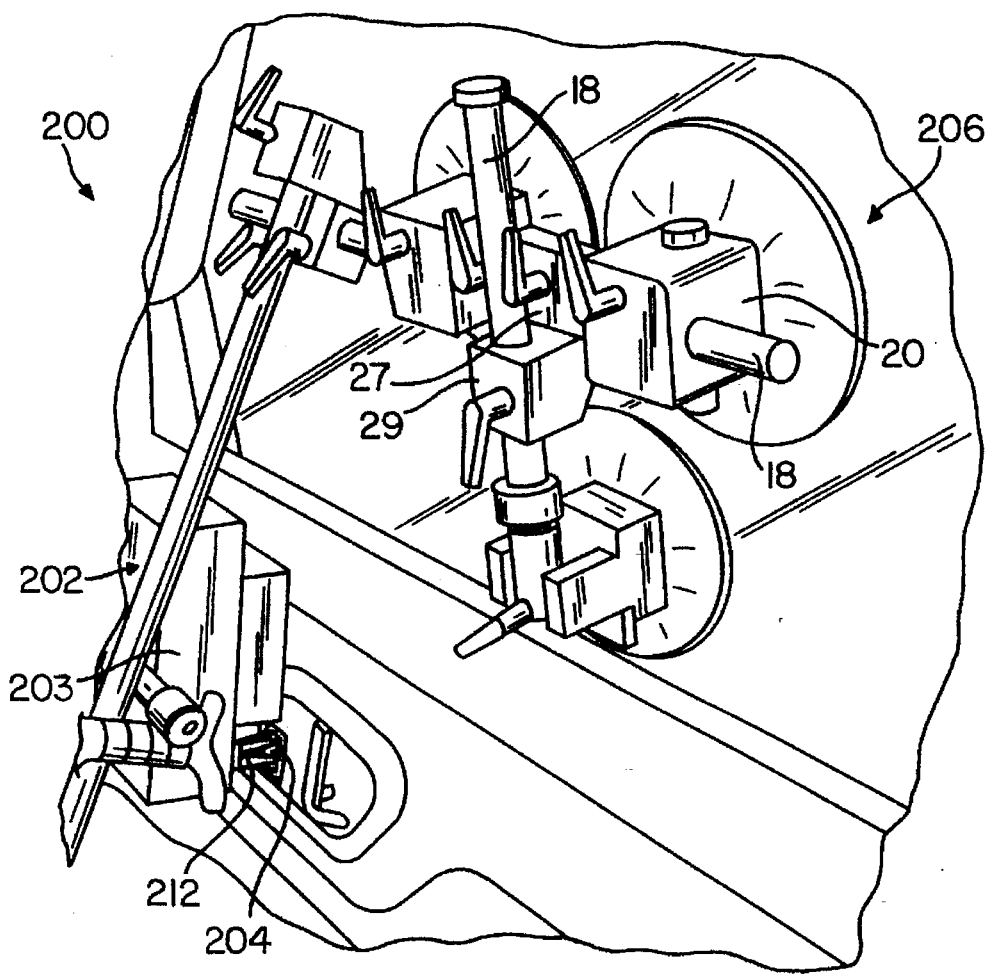
FIG. 4 is a perspective view showing a door lock knob testing module corresponding to a third embodiment of an apparatus manufactured in accordance with the principles of the present invention.

FIG. 4 is a perspective view of a module 200 having a movable assembly 202 adapted to engage a manually movable member in the form of a motor vehicle inside door lock knob 204. The movable assembly 202 is mounted on an appropriate mounting assembly 206, which is similar in principle to the mounting assembly 14 shown in FIG. 1, but is adapted for mounting within the interior of a motor vehicle, as shown. In addition, the movable assembly 202 is similar in many respects to the movable assembly 30 shown and described with respect to the first embodiment. The movable assembly 202 includes a fixed base 203, and a movable element in the form of pincer elements 212, which are mounted for movement relative to the fixed base 203. The principal difference in the movable assembly 202, in comparison with the movable assembly 30 in the first embodiment, lies in the provision of the pincer elements 212, which are adjustably mounted on mounting bars 46. As can be appreciated from FIG. 4, the pincer elements 212 are adapted to engage the lock knob 204 from above and below. The movable assembly 202 is driven by a drive mechanism (e.g., such as motor 72 in FIG. 2) to move the lock knob 204 from a first position (e.g., a lower position in which the door lock is in an unlocked condition) to a second position (e.g., an upper position in which the door lock is in a locked condition) against the normal yieldable resistance of the locked knob 204. A data processing system connected with the movable assembly 202 receives signals from an encoder and an transducer (e.g., such as encoder 102 and load cell 100 in FIG. 2) to derive information indicative of the amount of force applied by the movable assembly via pincer elements 212 to the lock knob 204 as a function of the distance travelled by the lock knob. It can be appreciated that, as with the previous embodiments, in addition to obtaining data indicative of the force utilized in moving the lock knob from the first position to the second position, it is also possible, and desirable, to obtain information relating to the amount of force required to return the lock knob from the second position to the first position. As a result, it can be appreciated that the apparatus of the present invention is capable of characterizing the manual force required in both locking and unlocking the vehicle door from the inside by manual use of lock knob 204.

Figure 5:
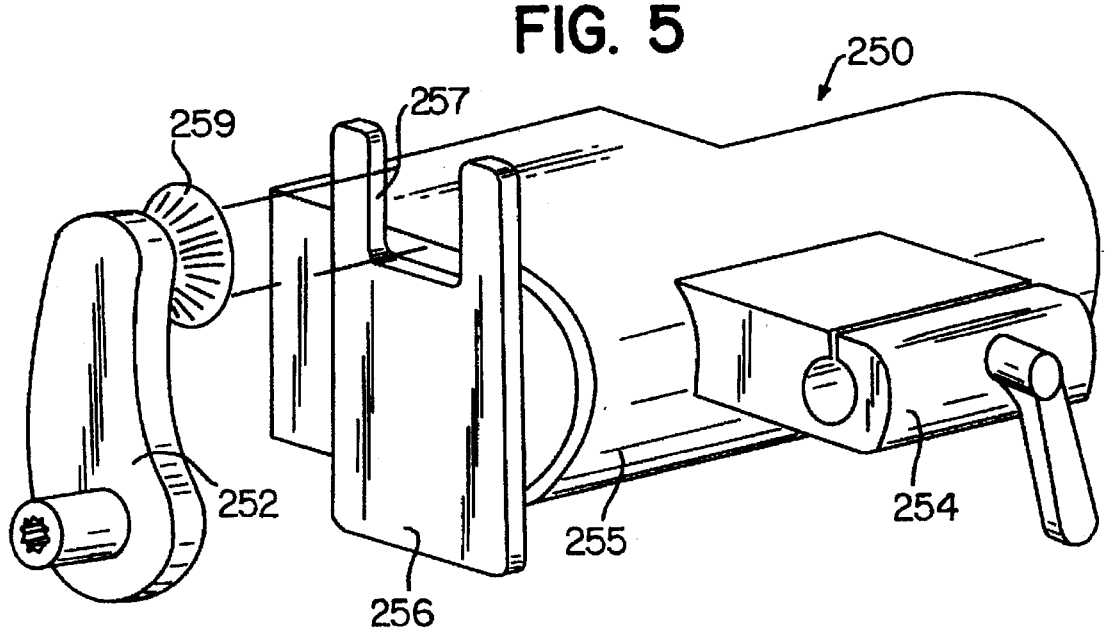
FIG. 5 is a perspective view showing portions of a window handle testing module corresponding to a fourth embodiment of an apparatus manufactured in accordance with the principles of the present invention.

FIG. 5 is a perspective view showing a movable assembly 250, manufactured in accordance with the fourth embodiment of the present invention. The inner workings of movable assembly 250 in this embodiment is virtually identical to that of the movable assembly 130 of the second embodiment shown in FIG. 3. The movable assembly 250 is constructed and arranged to engage a manually movable member in the form of a rotatable vehicle window handle 252. The movable assembly 250 is to be mounted via mounting block 254 to a mounting assembly mounted within the interior of a motor vehicle. The movable assembly 250 includes a fixed base 255, and a movable element in the form of a rotatable window handle engagement assembly 256. The engagement assembly 256 has a handle receiving portion 257, which is adapted to receive window handle knob member 259. The movable assembly 250 is identical in many respects to the key turning movable assembly 130 shown in FIG. 3 in accordance with the second embodiment of the present invention. The principal difference of the present embodiment, however, lies in the provision of the rotatable window handle engagement assembly 256, which takes the place of the key mounting assembly 160 of the second embodiment. The engagement member 256 is mounted for rotation with an appropriate torque cell (e.g., see torque cell 140 in FIG. 3). The movable assembly 250 further includes an encoder, transmission device, step motor, etc., as described with respect to the second embodiment shown in FIG. 3.

Figure 6:
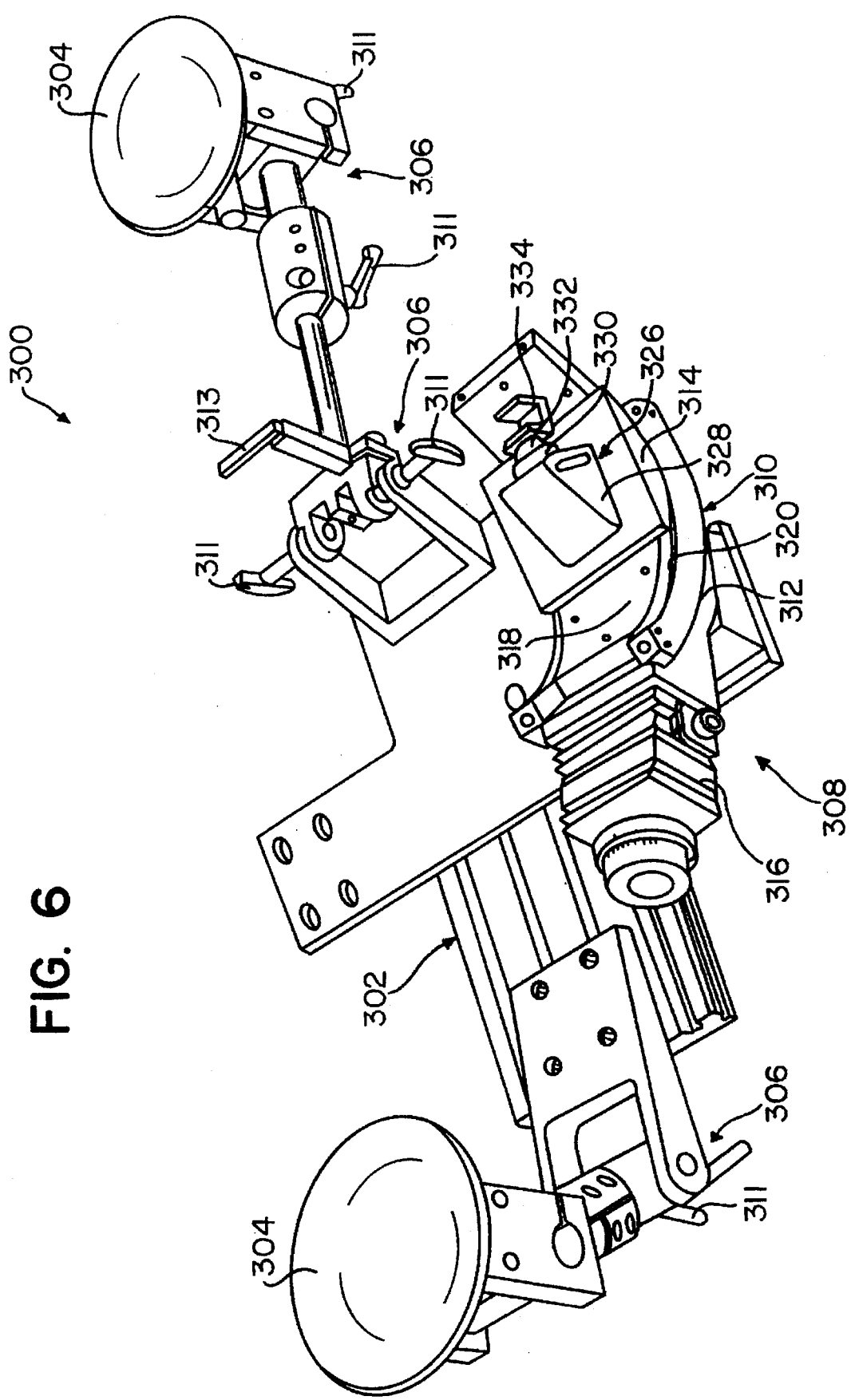
FIG. 6 is a perspective view showing a door handle testing module corresponding to a fifth embodiment of an apparatus manufactured in accordance with the principles of the present invention.

FIG. 6 is a perspective view, generally showing a door handle movement module 300 in accordance with a fifth embodiment of the present invention. The module 300 includes a mounting assembly 302, having mounting elements in the form of suction cups 304, which enable the module to be mounted on the motor vehicle. The mounting assembly 302 is pivotally jointed with strategically placed pivot assemblies 306 to enable the mounting assembly 302 to conform to the exterior or interior shape of any given motor vehicle. The ideal configuration for the mounting assembly can be accomplished by loosening adjustment handles 311, altering the configuration of the mounting assembly, and then tightening the adjustment handles. A stabilization bar 313 is provided for engagement with the exterior of the motor vehicle and serves as additional enforcement for stabilizing the module 300 relative to the vehicle in similar fashion to the manner in which stabilization bar 37 functions in the embodiment shown in FIG. 1.

The module 300 comprises a movable assembly, generally indicated at 308, which includes a motorized goniometric cradle assembly 310 mounted on the mounting assembly 302. The cradle assembly 310 is provided with a fixed base 312, a movable plate 314 mounted for movement on the fixed base 312, and a stepping motor 316 for driving the movable plate to move relative to a fixed base 312. Also provided is an internal encoder (not shown), which is typically included with cradle assemblies of this sort. Goniometric cradles of this type are conventional and available from Newport-Klinger of Garden City, New York (Model No. BG120PP).

In FIG. 6, it can be appreciated that the fixed base 312 has an arcuate surface 318, and guiding tracks 320 disposed on either side of the surface 318. The tracks provide appropriate driving elements, which are driven by stepping motor 316 to move the movable plate 314 along the arcuate path defined by surface 318. The movable plate 314 is provided with a plurality of outwardly facing mounting holes (not shown) to enable various devices to be mounted thereon. In FIG. 6, a door handle engagement assembly 326. The engagement assembly, generally indicated at 326, includes a mounting block 328, a load cell mount 330, a transducer or load cell mount 330, a transducer or load cell 332, and a handle engagement member 334.

In FIG. 7, the module 300 is shown mounted on the exterior of a motor vehicle 340. As shown, the engagement member 334 is engaged with a vehicle door handle 342, which is normally spring biased into an operative position (e.g., in which the vehicle door latching assembly is latched with respect to the door opening). In FIG. 7, the engagement member 334 is shown in a position in which it has moved the door handle 342 against the spring bias into an inoperative position in which the vehicle door latching assembly is disposed in an unlatched condition with respect to the door opening. The force required to accomplish this movement can be detected by load cell 332, and this information can be used to derive data indicative of the force utilized in moving the handle into the position shown as a function of distance travelled by the handle. Similarly, the amount of resistive force applied by the engagement member 334 to the handle 342 can also be measured as the handle is returned to its initial, operative position.

It can be appreciated that the mounting assembly 302 is adapted to enable the cradle assembly 310 to be positioned and fixed at an ideal position relative to the door handle 342. More specifically, as can be appreciated from FIG. 8, the cradle assembly 310 is ideally positioned such that the arcuate surface 318 defines an imaginary circle having a central axis, normal to the circle, generally disposed in coaxial relation with respect to a pivotal axis 350 of door handle 342. This will ensure that the force measured by load cell 332 will always be an accurate measurement of the force required to pivot the door handle 342 about its pivotal axis 350 against the normal spring bias of the door handle 342. The aforementioned co-axial alignment can be obtained by use of a coordinate measuring machine (C.M.M.), as known in the art, or preferably by use of a customized plate-like template 343, shown in dashed lines, which is specifically shaped to match the particular outer door skin 345, door handle 342, arcuate surface 318 and other portions of the cradle assembly 310. Prior to fixedly securing the cradle assembly in place, the template 343 is temporarily manually held (e.g., by use of the handle formed by opening 347) so that one edge 349 of the template is disposed in nesting relation with respect to the outer door skin 345. By then engaging the arcuate surface 318 of cradle assembly 310 with an opposite arcuate edge 351 of the template, the cradle assembly 310 can be accurately positioned before it is fixed in place by the mounting assembly 302.

The solid line drawing of engagement 326 in FIG. 8 shows an appropriate starting position for the engagement assembly 326. It can be appreciated that the mounting block 328 of engagement assembly 326 is provided with an adjustment assembly 352, which enables the position of the load cell mount 330 to be adjusted with respect to the mounting block 328 in order to accommodate for different length door handles.

When the stepping motor 316 receives an appropriate signal from the data processing system, it functions to drive the movable plate 314, and hence the engagement assembly 326, to the dashed line position shown in FIG. 8. Such movement causes the door handle 342 to be pulled against the bias thereof, and enables load cell 332 to generate a signal proportional to the force applied in moving the door handle 342 to the dashed line position. The signal generated by the transducer or load cell 332, and a signal generated by the encoder carried by the cradle assembly 310 are sent to the chassis 333 and computer 335 via electrical lines 337 and 339, respectively. The chassis 333 and computer 335 form part of the data processing system of the present invention, which will be described later in greater detail. As has been described above with respect to FIG. 7, it can be appreciated that the apparatus shown in FIG. 8 can also be used to measure the force applied by the door handle 342 to the engagement member 334 during the return of the engagement assembly 326 to the solid line position.

Figure 10:
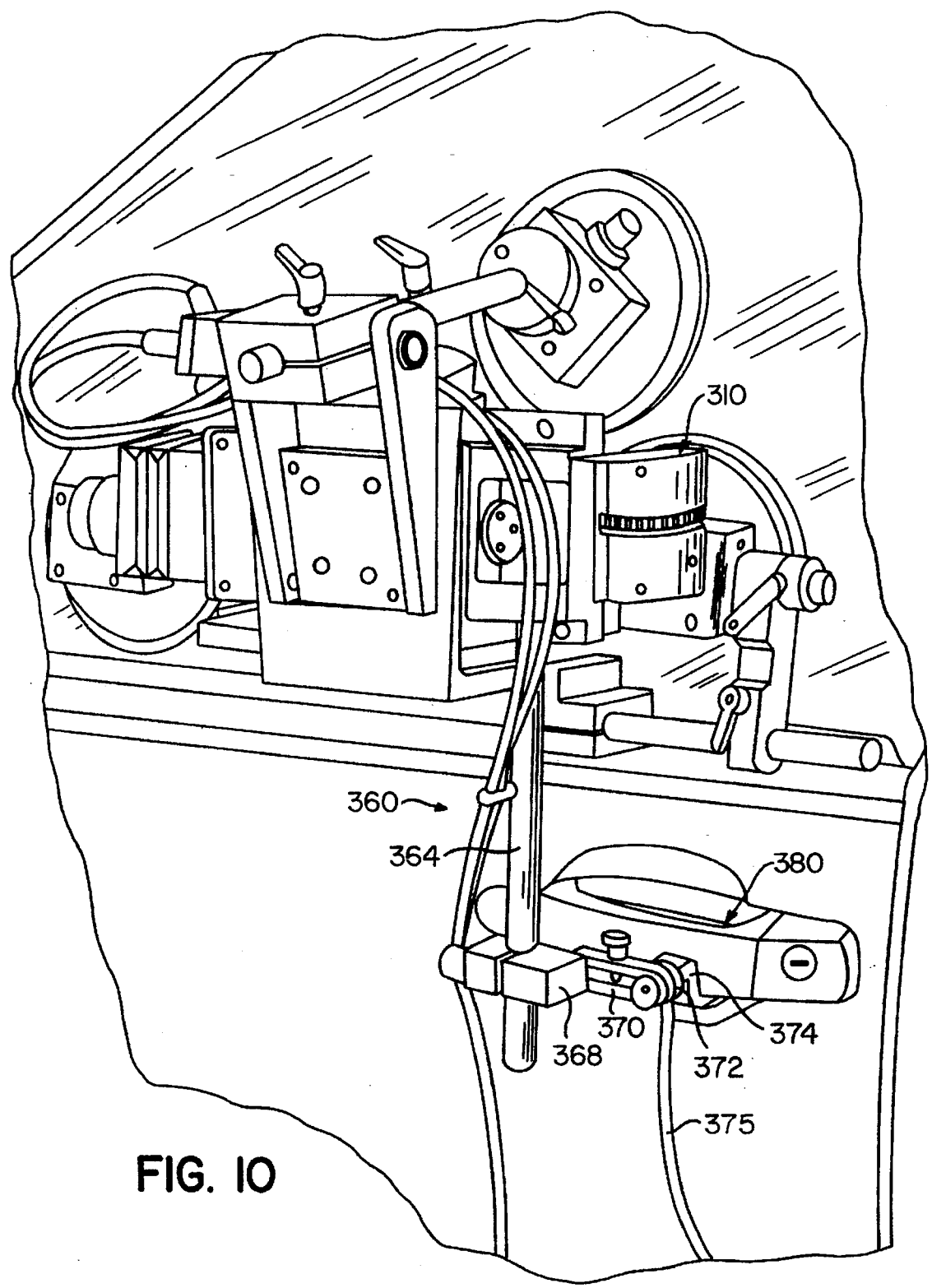
FIG. 10 is a perspective view of the door handle testing module of the sixth embodiment, shown mounted on exterior portions of a motor vehicle for engagement with an exterior vehicle door handle.

FIG. 9 is a perspective view showing an alternate engagement assembly 360 in accordance with the sixth embodiment of the present invention. More specifically, the engagement assembly 360 is adapted to be mounted on the movable plate 314 in place of the engagement assembly 326 via mounting block 362 in FIGS. 6–8. An extension rod 364 extends between the mounting block 362 and a load cell mounting assembly, generally indicated at 366. The load cell mounting assembly 366 includes a mounting block 368 connected to an opposite end of the extension rod 364, and an adjustment assembly 370 for adjusting the relative position to a load cell 372 with respect to the mounting block 368. An engagement member 374 is connected with the load cell 372 and is adapted to engage various different types of door handles. For example, in FIG. 10, the engagement assembly 360 is mounted with respect to the cradle assembly 310 so that the engagement member 374 can engage a vehicle exterior door handle 380, which is pivotal about a vertical axis, as opposed to a horizontal axis as shown in FIGS. 7 and 8. In FIG. 10, electrical wiring 375 is shown extending from load cell 372, and provides an electrical conduit for the load cell.

Figure 11:
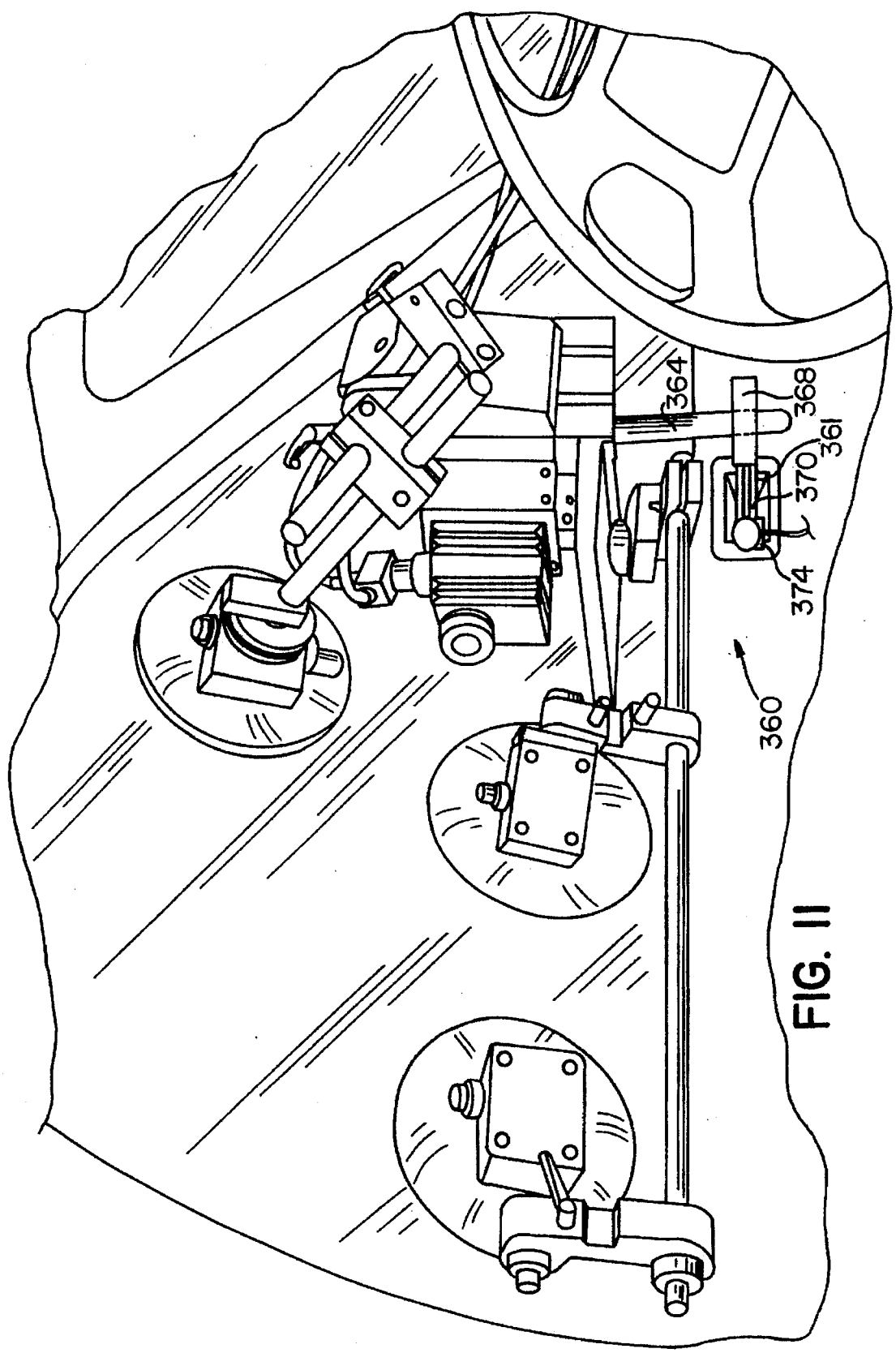
FIG. 11 is a perspective view of the door handle testing module of the sixth embodiment, shown mounted on interior portions of the motor vehicle for engagement with an interior vehicle door handle.

In FIG. 11, the apparatus according to the sixth embodiment is shown mounted within the interior confines of the motor vehicle, and the engagement assembly 360 is in engagement with an interior vehicle door handle 361 having a substantially vertical pivotal axis.

Figure 12:
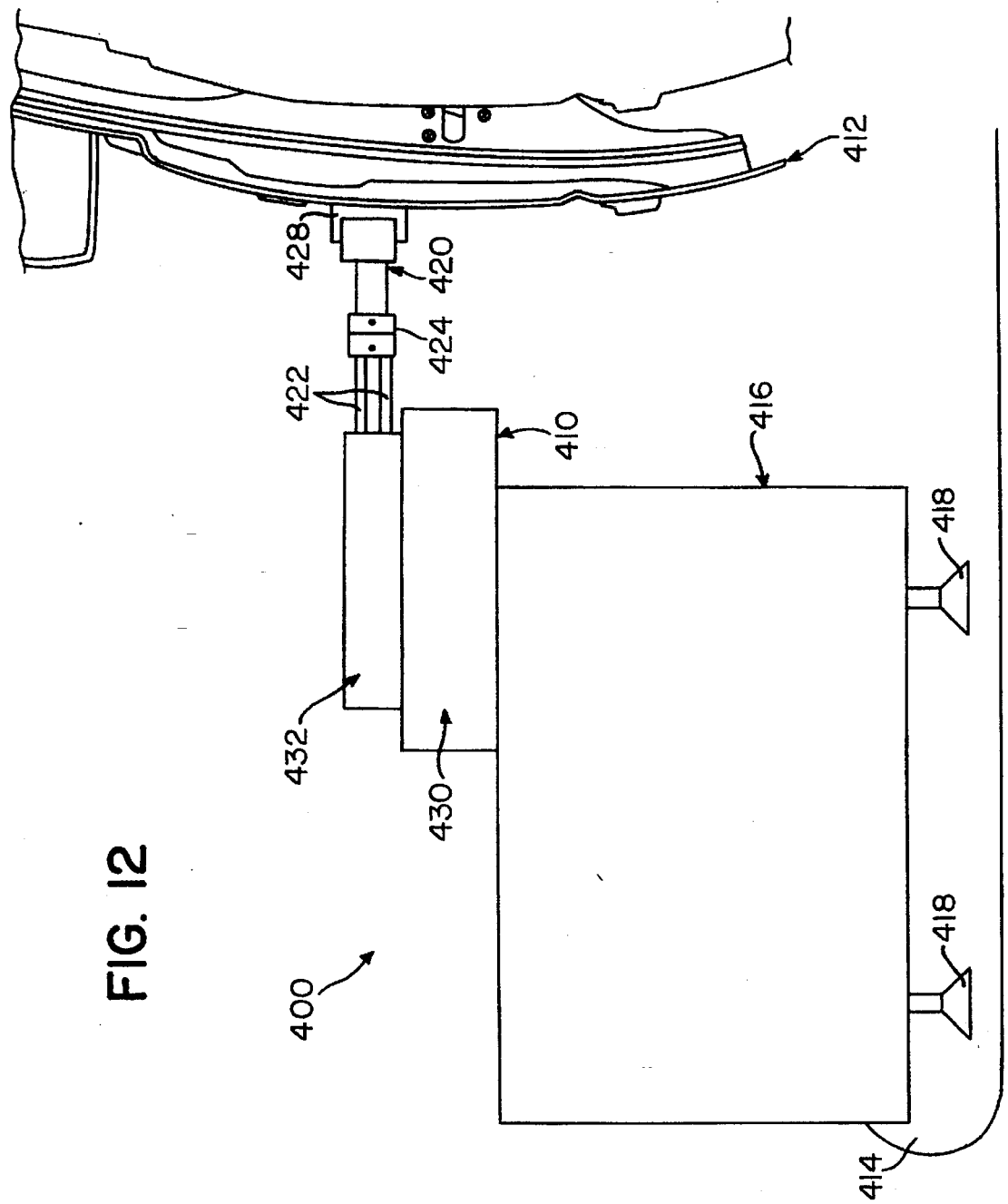
FIG. 12 is a schematic side view showing a door seal force testing module corresponding to a seventh embodiment of an apparatus manufactured in accordance with the principles of the present invention.

FIG. 12 is a schematic view of a module 400 having a movable assembly 410 constructed and arranged to engage a manually movable member in the form of a motor vehicle door 412. Unlike the previous embodiments, the movable assembly 410 is fixedly mounted with respect to an area adjacent the motor vehicle, in this case the surrounding ground 414. More specifically, the movable assembly 410 is mounted upon a rigid mounting assembly 416, which is fixed in place on the ground 414 by an appropriate means, such as by suction cups 418. The movable assembly 410 in this embodiment is substantially similar to the movable assembly 30 in the first embodiment (e.g., see FIG. 1), with the exception that the components here are made to be more massive, and has a motor with a greater horsepower. In addition, the movable assembly 410 is provided with an adaptor in the form of a rigid bumper 420 mounted on the parallel mounting bars 422 by an appropriate conversion member 424. The rigid bumper 420 includes a rubber end piece 428 adapted to engage in a rearward-most portion of the vehicle door skin (e.g., adjacent the exterior door handle). Upon activation of the motor carried within fixed base 430, the movable element 432 is moved with respect to the fixed base to drive the rigid bumper 420 forwardly to cause the vehicle door 412 to close against the yieldable resistance of the vehicle door. In this embodiment, it is preferable for the vehicle door to begin from a standstill at a first position, in which it is slightly ajar, and continue movement to a terminal second position, wherein the vehicle door is completely sealed within the door opening. In this embodiment, the apparatus is particularly adapted to determine the amount of force required to cause the vehicle door to seal about its periphery within the vehicle door opening.

Figure 13:
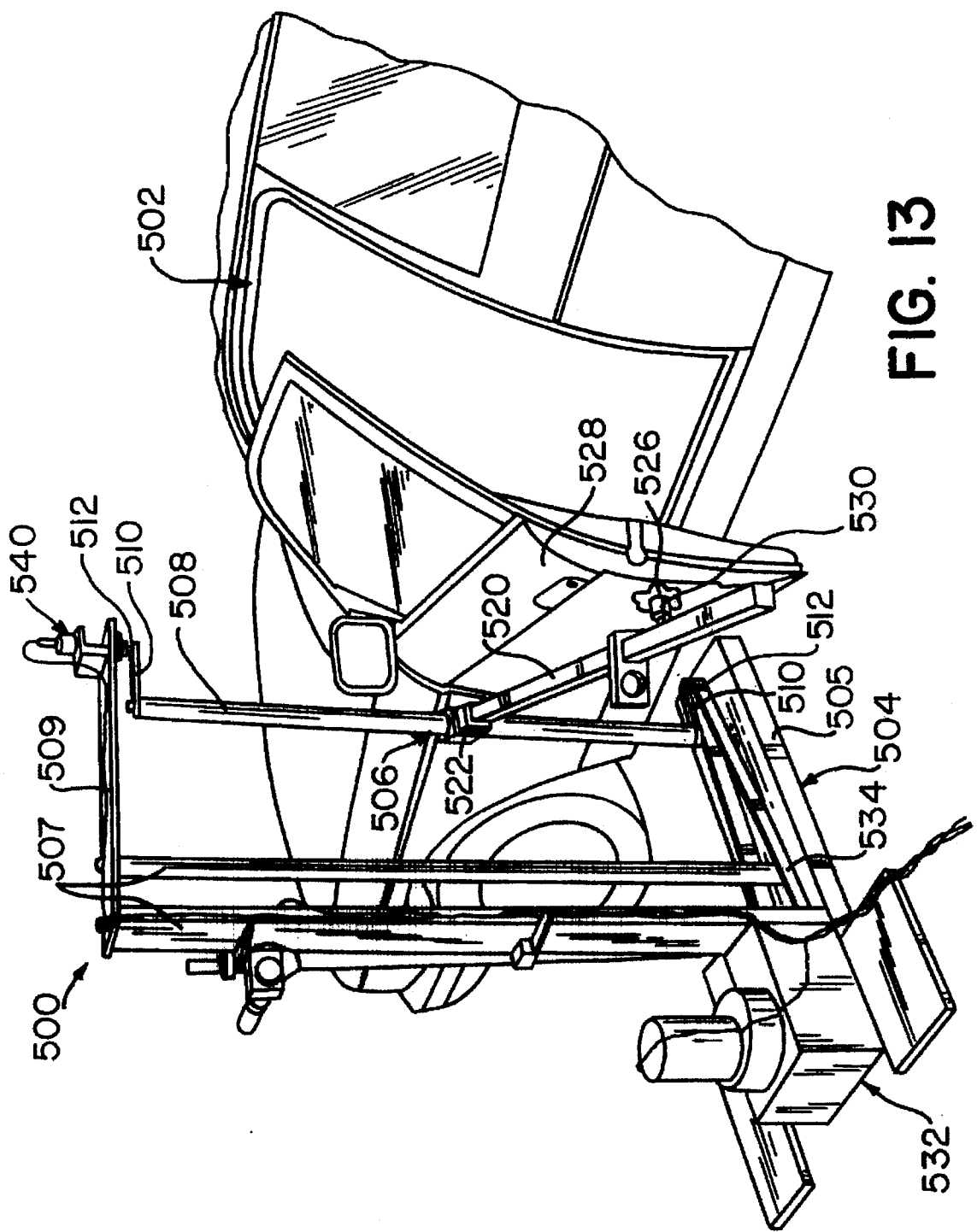
FIG. 13 is a perspective view showing a door closing testing module corresponding to an eighth embodiment of an apparatus manufactured in accordance with the principles of the present invention.

FIG. 13 is a perspective view in accordance with an eighth embodiment of the present invention. In this embodiment, a movable assembly 500 is constructed and arranged to engage a manually movable member again in the form of a motor vehicle door 502.

The movable assembly 500 includes a fixed base 504 and a movable element, generally indicated at 506. The fixed base 504 includes a main lower mounting block 505, rigid vertical supports 507, and an upper horizontal support 509. The movable element 506 includes a vertical brace 508 connected at opposite ends thereof to respective horizontal extension brackets 510. The opposite ends of extension bracket 510 are pivotally mounted for rotation with respect to the fixed base at upper and lower pivot points 512. The axis which extends through pivot points 512 also extends through the door hinge, so that the vertical brace 508 and the vehicle door 502 are pivotable about a common axis. A rigid horizontal support bar 520 is rigidly connected with the vertical brace 508 via mounting block 522. A rubber engagement element 526 is adapted to engage the exterior door skin 528 at a rearward extremity thereof, and a transducer, in the form of a load cell 530 is positioned between the engagement element 526 and the support bar 520. A motor 532 drives an endless belt 534, which is operatively connected with a lower portion of the movable element 506 at the lower pivot point 512 in such fashion that driven movement of the belt 534 causes the movable element 506 to be pivotally rotated about its respective pivotal axis defined by pivot points 512. Pivotal movement of movable element 506 causes the support bar 520 to move towards the vehicle door 502, and load cell 530 is compressed as the movable element 506 functions to begin closing movement of the vehicle door 502. The load cell 530 generates signals as a function of the force utilized in closing the vehicle door against the yieldable resistance of the door. It can be appreciated that the force required to close the door 502, and the yieldable resistance of said door will be a function of the weight of the door, and the frictional engagement of the door with other portions of the vehicle (e.g., at the door hinge). An angle encoder 540 is mounted on the movable assembly at the upper pivot point 512 and measures the angular distance travelled by movable element 506.

Figure 14:
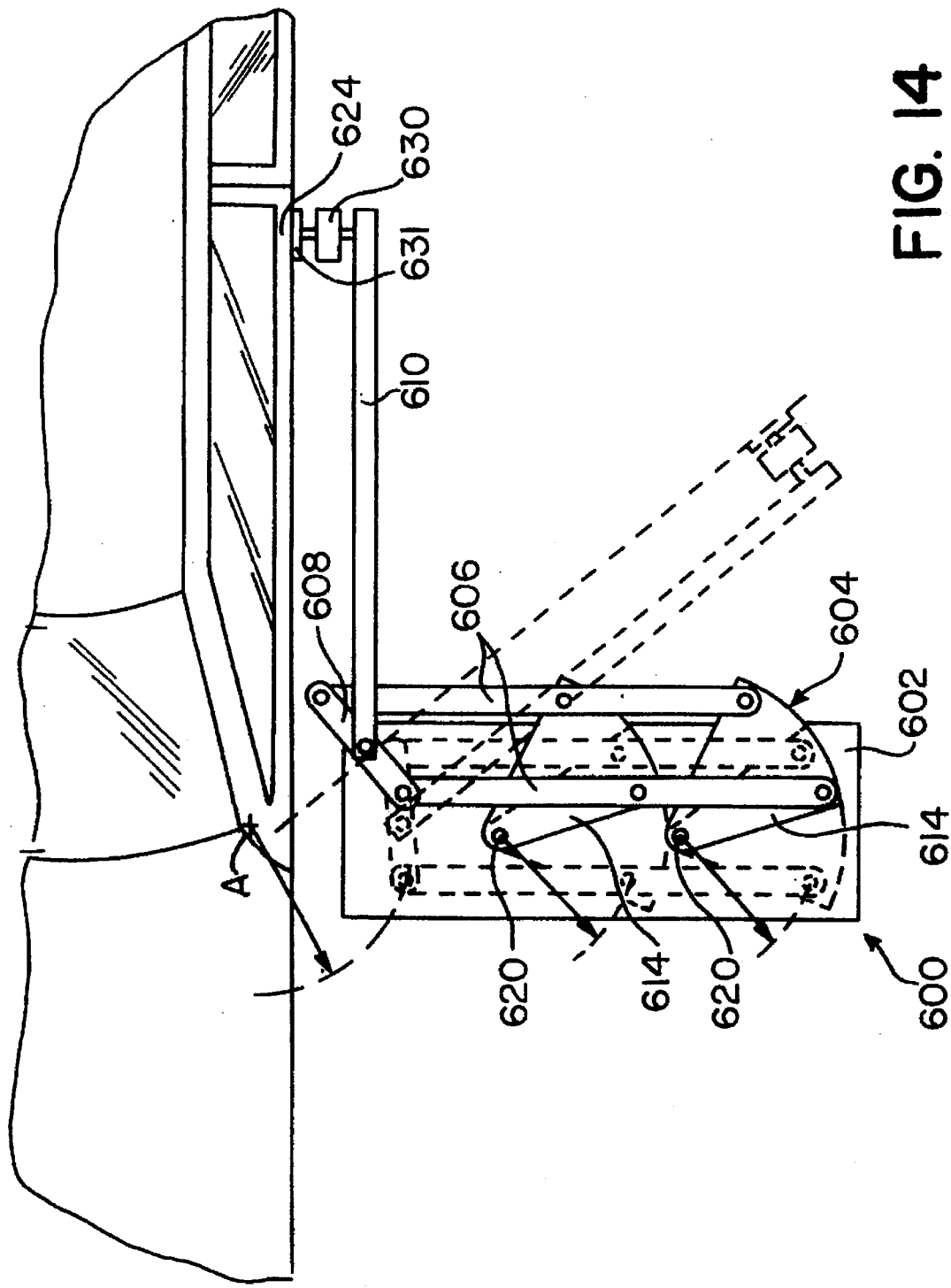
FIG. 14 is a schematic top view showing a door closing testing module corresponding to a ninth embodiment of an apparatus manufactured in accordance with the principle of the present invention.

FIG. 14 is a ninth embodiment in accordance with the principles of the present invention. The embodiment shown in FIG. 14 is similar to that shown in FIG. 13 in that it provides a movable assembly that is constructed and arranged to engage a manually movable member in the form of a motor vehicle door. In addition, the module shown in FIG. 14 is particularly adapted to measure the force required to provide the initial movement required in causing the vehicle door to swing closed. In this embodiment, a movable assembly 600 includes a fixed base 602 and a movable element, generally indicated at 604, mounted for movement with respect to fixed base 602. The movable element 604 is provided in the form of a four bar linkage, including a pair of parallel spaced elongate bars 606, an end bar 608 connecting one end of each of the bars 606, a support bar 610 fixedly connected at an intermediate point of the connecting bar 608, and a pair of substantially triangular pivotal members 614, which pivotally connect the bars 606 with respect to the fixed base 602. The pivotal members 614 are rotated in a counterclockwise direction as shown in FIG. 14, from the dashed line positions to the solid line positions, about their main pivots 620, to effectuate door closure. This pivotal movement of the pivotal members 614 about main pivots 620 is accomplished by a stepping motor (not shown) carried within fixed base 602. Each of the bars 606 are pivotally mounted with both pivotal members 614 in such fashion that counterclockwise movement of the pivotal members 614 causes relative movement of the two bars 606 in the fashion shown. This relative movement of bars 606 causes the connecting bar 608 to be rotated about an imaginary axis A, which is to be aligned with the pivotal axis of the vehicle door 624. Such alignment can be accomplished with a template, as can be appreciated from the discussion of the embodiment of FIG. 8.

As pivotal members 614 are rotated in the counterclockwise direction, the movement of connecting bar 608 about axis A causes the support arm 610 to move the vehicle door 624 against the yieldable resistance thereof, while exerting compressive forces upon a load cell 630, disposed between a vehicle door engagement member 631 and the support arm 610. The load cell is capable of generating signals to the data processing apparatus indicative of the amount of force utilized in closing the door. It can be appreciated that the amount of force utilized can be measured throughout the range of door travel, from the dashed line position, wherein the vehicle door 624 is open to a large extent, to the solid line position, wherein the door 624 is completely closed. However, the present embodiment is intended primarily to focus upon the energy utilized in only an initial movement of the door 624 (e.g., through approximately 30–60 degrees) in order to characterize the amount of initial force that is utilized to cause the door to swing shut, as in a typical manual door closing operation.

In each of the above-described embodiments, it can be appreciated that the force applied by the movable assembly to the manually movable member is always opposed by an equal and opposite force applied by the manually movable member to the movable assembly, as a principal law of physics. Thus, for example, in FIG. 8, a measurement of the amount of force applied by the movable assembly 308 to the door handle 302 is exactly equal and opposite the force applied by the door handle 342 to the manually movable assembly during movement from the solid line position to the dashed line position in FIG. 8. Otherwise put, when manually lifting the door handle 342, the manual force applied to the door handle is equal an opposite the force applied to an individuals hand. Thus, the measurements obtained by use of the apparatus can be used as a measure from both perspectives.

Figure 15:
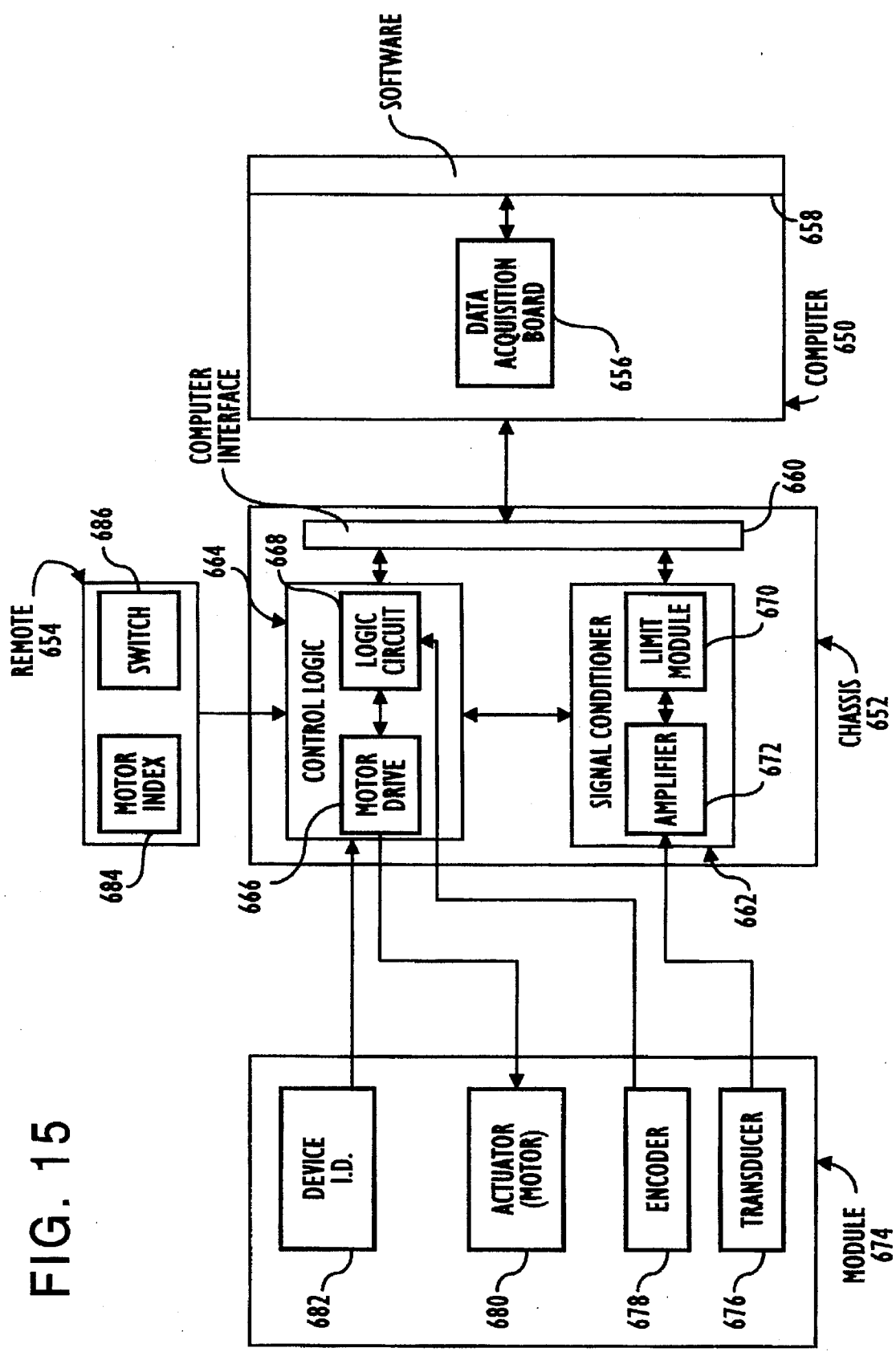
FIG. 15 is a block diagram showing an electrical schematic for the apparatus manufactured in accordance with the principles of the present invention.

FIG. 15 is a block diagram showing an electrical schematic for the apparatus of the present invention. The electrical schematic shows a data processing system, which includes a computer, generally indicated at 650, an electrical chassis, generally indicated at 652, and a remote manual unit, generally indicated at 654. The computer 650 includes a data acquisition board (e.g., hardware) 656 and appropriate software 658. The computer 650 communicates with chassis 652 via a computer interface 660 provided with the chassis 652. The chassis 652 includes a signal conditioner 662 and control logic 664. The control logic 664 includes a motor drive 666 and a logic circuit 668. The signal conditioner 662 includes a limit module 670 (e.g., a comparator) and a transducer signal amplifier 672. The data processing system, including the computer 650 and chassis 652 are adapted to interface with the modules of each the embodiments described herein.

A module, generally indicated at 674, includes a transducer 676, an encoder 678, an actuator (motor) 680, and a device or module identification circuit 682.

The remote unit 654 includes a motor indexing circuit 684 and an operation switch 686.

Operation of the system will be generally described in conjunction with respect to FIGS. 15 and 16a–16d, which constitute a flow diagram outlining the data processing system logic for the apparatus in accordance with the principles of the present invention.

Figure 16A:
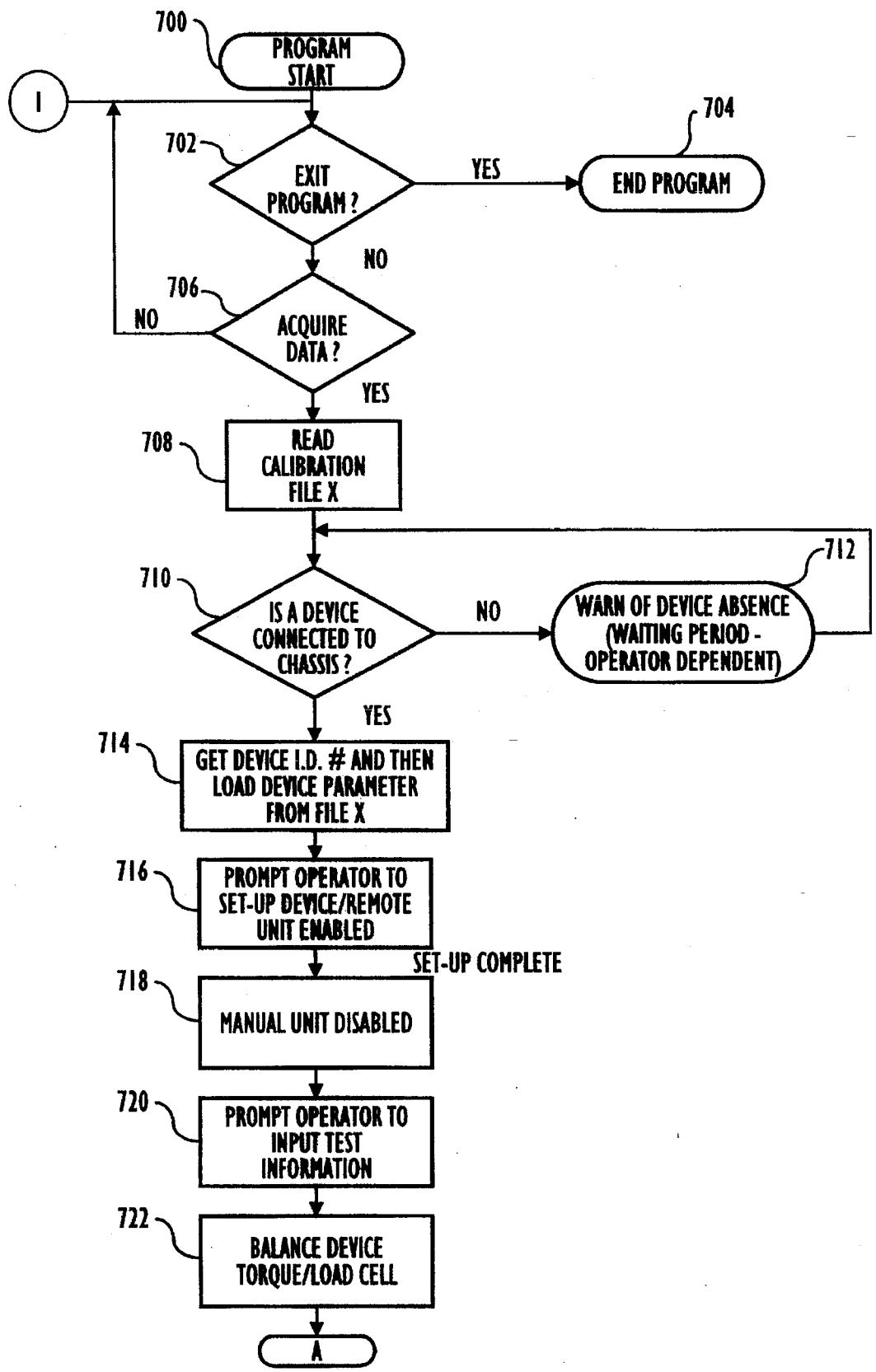

In FIG. 16a, the data processing system begins operation at step 700. Here, an operator utilizing computer 650 is provided with a prompt 702, which provides the operator the option of exiting the computer program (step 704) or acquiring data (step 706). If the operator chooses to acquire data, certain data will be read from a calibration file (step 708), designated as FILE X, contained on the hard drive of computer 650. The calibration file contains preprogrammed information for each module, such as appropriate motor speed, maximum load to be measured before the motor will be shut down, motor drive acceleration rate, load sensor gains, etc. Next, at step 710, the program will determine whether a device or module 674 is connected to the chassis 652. If not, the program moves to step 712, warns the operator, and waits until a device is connected to the chassis. The program will not proceed until after a device has been connected to the chassis and the operator satisfies a prompt. When a device is in place, the program proceeds to step 714, at which time the device I.D. 682 sends a signal which travels through the control logic circuit 664 and is eventually processed by the computer 650. The computer 650 can then identify the particular module 674 which has been installed and loads the parameters relating to the particular module from the calibration file. Next, at step 716, the remote unit 654 is enabled, and the operator is provided with a prompt to set-up the module 674 by using the remote unit. The remote unit 654 is provided with an indexing dial, forming part of the indexing circuit 684, which can be used to directly index the motor 680 via motor drive circuit 666. Direct indexing of the motor enables the moveable assembly, and in particular the movable element of the movable assembly, to be appropriately positioned prior to data acquisition. For example, in the first embodiment shown in FIGS. 1 and 2, the motor 72 is indexed until the key 52 assumes the position shown in FIG. 1. After set-up is complete, the operator responds to a prompt to continue, and the manual remote unit 654 will be disabled at step 718. Next, at step 720, the computer will prompt the operator to input test information, such as the operator's name, the vehicle being tested, and a brief test description. After the information is input, the program moves to step 722, wherein the transducer 676 is balanced. The balance value is stored in program memory.

Figure 16B:
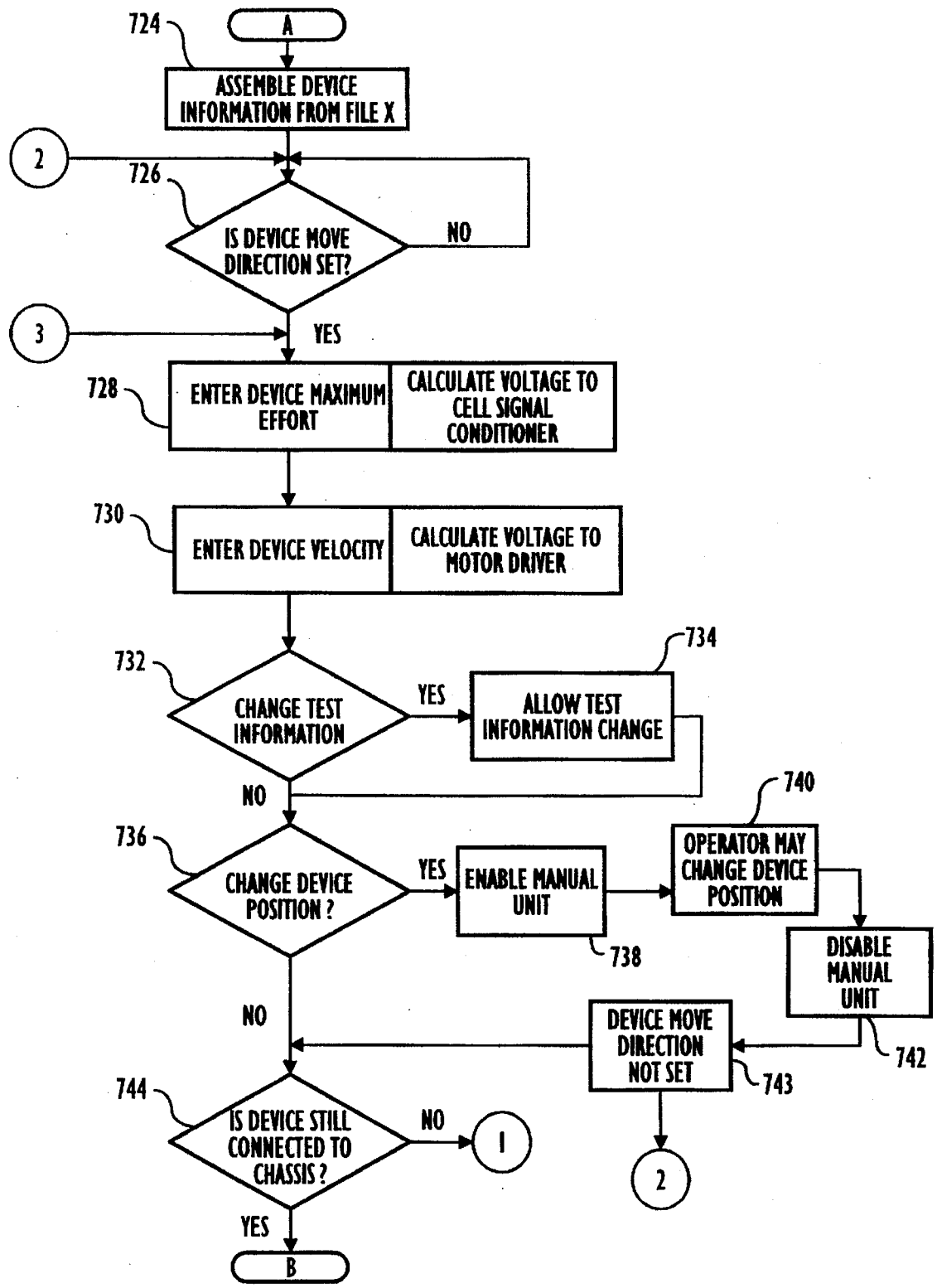

Turning now to FIG. 16b, which is a continuation of the flow chart from FIG. 16a as indicated by bubble A, at step 724, all data read from the calibration file, the load sensor balance value, the device I.D. number, and the test information is assembled. Next, at step 726, a prompt will inquire as to whether the initial direction of motor movement has been set. More particularly, many, if not all of the embodiments of the present invention are adapted to obtain force measurements in both directions of travel of the manually movable members. For example, in the key turning apparatus of FIG. 3, data can be gathered when the key 154 is rotated by the motor 150 in both the clockwise and counterclockwise directions. Once the move direction is set, the program moves to steps 728–744, which provide an opportunity for the operator to input and/or alter certain test parameters at steps 728 and 730 (e.g., such as motor/device velocity) or test information at steps 732 and 734, and to change the device position (steps 736–743).

At step 728, the operator can input a maximum force which is to be detected by transducer 676 before operation of the motor 680 will be discontinued. For example, with the key insertion module in place, the operator may decide that, rather than the preprogrammed value of 9 Newtons, it is appropriate continue motor operation until a force of 10 Newtons is detected by the transducer 676. In this event, the operator will satisfy a prompt by inputting the 10 Newton value. At an appropriate time (see step 754) a signal indicative of the 10 Newton value will be sent and stored in comparator or limit module 670. When the limit module receives a signal from the transducer amplifier 672 indicating that a force of 10 Newtons has been reached, the limit module 670 will send a signal to motor drive 666 to discontinue operation of motor 680. Note that at step 744, if the device or module has been disconnected from the chassis, the program will return to step 702 in FIG. 16a.

Figure 16C:
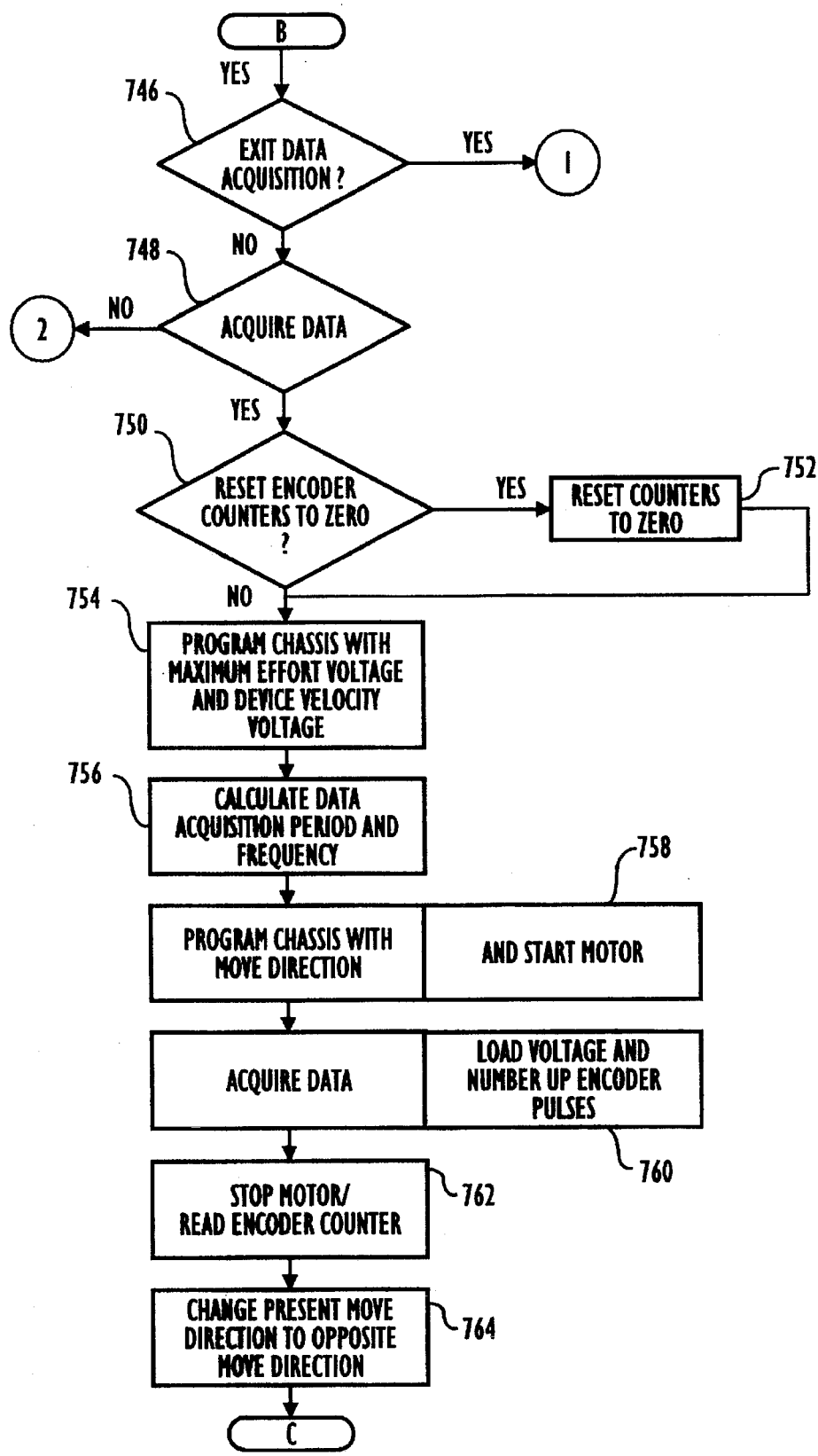

Turning now to FIG. 16c, which is a continuation of the flow chart from FIG. 16b as indicated by bubble B, at steps 746 and 748, if the operator no longer wishes to acquire data, he may answer an appropriate prompt and return to step 702 in FIG. 16a or step 16b, as can be appreciated from the flow diagram. The program then proceeds to steps 750 and 752, which will zero the encoder counter the first time steps 750 and 752 are performed. In instances in which step 750 is performed again for subsequent tests (i.e., without the program being interrupted or reset for a different test), the encoder counter will not be zeroed. At step 754 (described above), the maximum force voltage and motor velocity is sent from the computer 650 to the chassis 652. At step 756, based on the programmed motor speed, the program will calculate the appropriate data acquisition speed (i.e., number of force measurements taken per second), and the time required to move the movable assembly through the full possible range of movement. For the most accurate results, it is preferred, for each of the disclosed embodiments, that the predetermined range of movement through which the manually movable member is tested be at least slightly shorter than the full possible range of movement. However, the data acquisition period may be set at an interval in which the full range of motion can be accomplished in order to minimize the likelihood of any data being inadvertently excluded. Next, at step 758, the move direction (e.g., as set at step 726) is sent from the computer 650 to the motor drive circuit 666, which then sets the motor 680 in motion. At step 760, the apparatus begins to take measurements and acquire data for the time interval and at the frequency determined at step 756. At step 762, the motor is stopped when a sufficiently large signal is sent by the transducer 676, via signal amplifier 672, to the limit module 670. Alternately, the program may be such that motor will be stopped when an appropriate period of time has elapsed (e.g., the data acquisition period). At step 762, a reading of the encoder counter is also taken. Next, at step 764, the program reverses the move direction.

Figure 16D:
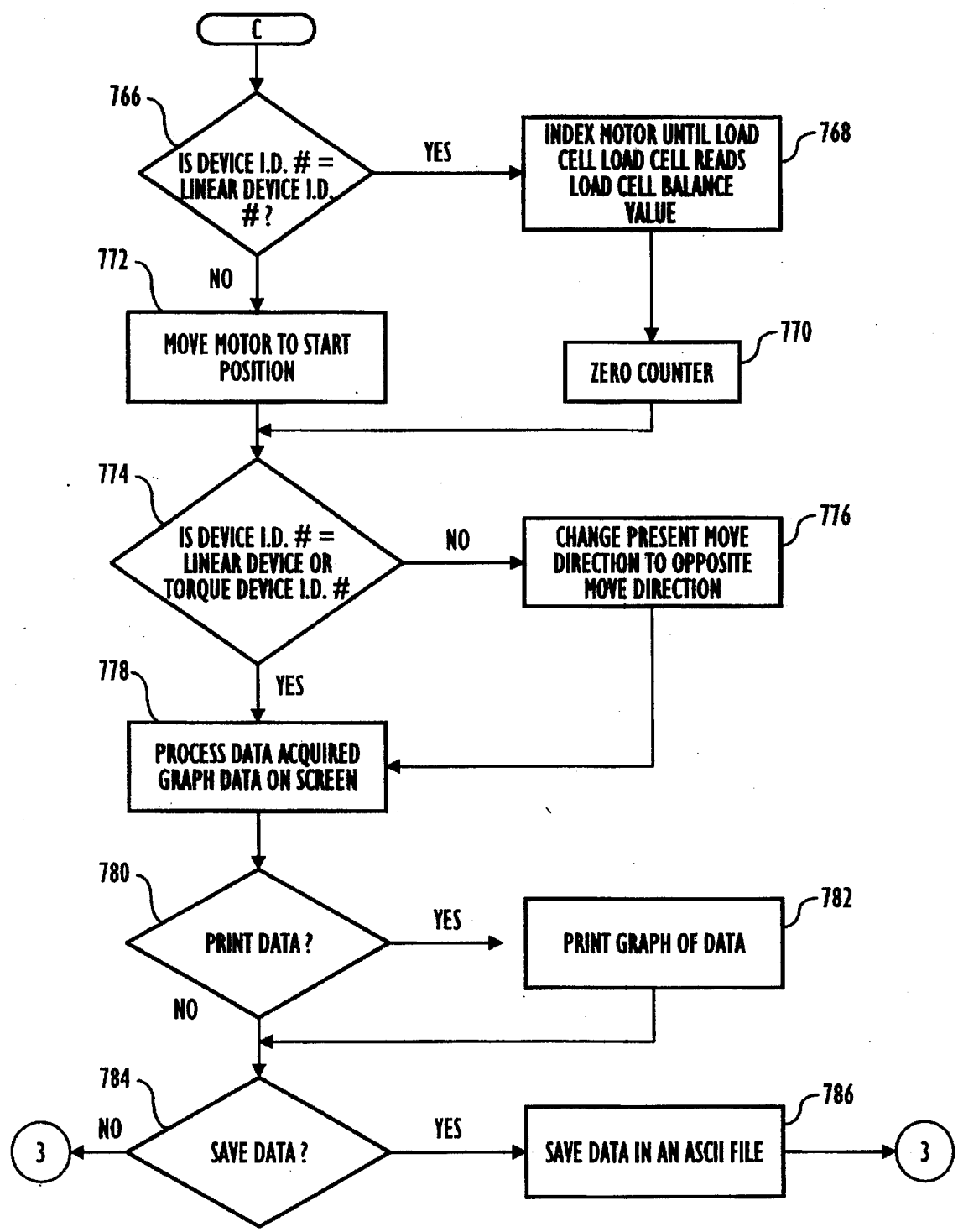

Turning now to FIG. 16d, which is a continuation of the flow chart from FIG. 16c as indicated by bubble C, at step 766, the apparatus determines whether the device I.D. number (i.e., as provide by circuit 682) corresponds to a linear device (e.g., key insertion, lock knob force, etc.). If the device is determined to be a linear device, move to step 768 and index the motor 680 until the load cell or transducer 676 reading is equal to the balance value (i.e., no load being applied). The encoder counter is then reset at step 770. If at step 766 it is determined that the device I.D. does not correspond to a linear device, the program then moves to step 772, which causes the motor to move back to the start position (at which point the encoder counter is at zero). At step 774, the program will determine whether the device I.D. corresponds to a linear device I.D. number or a torque device (e.g., key torque, window handle embodiments) I.D. number. If not, the motor move direction is changed to the opposite direction at step 776 and is prepared for movement in said opposite direction, and the program proceeds to step 778. If the device I.D. number does correspond to either the linear device or torque device, then the program proceeds to step 778, at which data (e.g., force vs. distance) is plotted as a graph or is provided as numeric information on the computer screen. At step 780, the computer provides a prompt asking the operator if a printed hardcopy of the data is desired. If so, the data will be printed at step 782. Next, the operator may save the data in an ASCII file at steps 784 and 786. As the next step, the program will jump to step 728, at which time new parameters may be input in preparation for a new test.

Each of the above-described embodiments include a movable assembly which is driven by a drive mechanism so that the movable assembly applies a force to a manually movable member and moves the manually movable member through a predetermined range of movement. Such an arrangement is most preferred, as the mechanically controlled movement of the movable assembly lends itself to highly repeatable and accurate measurement results. In the broader aspects of the present invention, however, the drive mechanism and movable assembly may be omitted and replaced by a manual movement of the manually movable member accompanied by manual engagement of a transducer with the manually movable member. For example, a load cell may be carried by the fingers and disposed between the fingers and a vehicle door handle as the door handle is manually moved. Electrical signals from the load cell are sent to the data processing system to derive data based on the force utilized in moving the door handle through its range of motion. In this instance, it can be appreciated that use of an encoder to measure the distance travelled by the handle may be impractical. Instead, the data processing system may simply plot the force applied by the transducer to the door handle as a function of time. While this method of gathering data is not as accurate or repeatable, it requires less set-up time, and, as with the above-described embodiments, advantageously provides a continuum of data indicative of the amount of force utilized in moving the door handle throughout a range of motion.

The present invention can be used to develop information which quantitatively characterizes the force utilized throughout the range of movement of the manually movable members. The information obtained can be used for a variety of purposes, such as comparing the manual feel of operating various manual components for different types of motor vehicles for competitive analysis, determining whether such components meet specified characteristics from vehicle-to-vehicle on an assembly line, and designing and engineering linkages of such components so that the components conform to specified ergonomic characteristics, for example.

It thus will be seen that the objects of this invention have been fully and effectively accomplished. It will be realized, however, that the foregoing preferred specific embodiments have been shown and described for the purpose of illustrating the principles of this invention and are subject to modification without departure from such principles. It can be appreciated, for example, that the structural and functional principles of the present invention equally apply to other embodiments which are adapted to test the force utilized in moving other manually movable members of a motor vehicle, such as the steering wheel, stick shift, glove compartment, turn-signal lever, etc. Therefore, this invention includes all modifications encompassed within the spirit and scope of the following claims.

What is claimed is:

1. An apparatus for acquiring data relating to an amount of force required to move a manually movable member operatively associated with a motor vehicle through a predetermined range of movement, said manually movable member having a manually engageable portion which is to be manually engaged during manually generated movement of said manually movable member through said predetermined range of movement, said manually engageable portion being moved along a path of driven movement having predetermined configuration during said manually generated movement, said apparatus comprising:

a movable assembly constructed and arranged to be able to engage said manually engageable portion of said manually movable member and maintain said engagement through said predetermined range of movement of said manually movable member, said movable assembly having a movable element which engages said manually engageable portion of said manually movable member and moves along a path of driving movement having a substantially same configuration as said predetermined configuration of said path of driven movement throughout said engagement with said manually movable member through said predetermined range of movement;

a drive mechanism constructed and arranged to drive said movable element along said path of driving movement so that said movable assembly applies a force in a direction along said path of driving movement to said manually movable member and moves said manually movable member through said predetermined range of movement along said path of driven movement having said substantially same configuration as said path of driving movement so as to generally simulate a predetermined manual movement of said manually movable member along said path of driven movement;

circuitry operatively connected with said movable assembly, said circuitry generating electrical signals indicative of the force applied to said manually movable member by said movable assembly during said predetermined simulated manual movement of said manually movable member along said path of driven movement through said predetermined range of movement;

a distance measuring device operatively associated with said movable assembly and constructed and arranged to generate electrical signals indicative of a distance traveled by said movable element, and hence said manually movable member, through said range of movement;

a data processing system responsive to said electrical signals generated by said circuitry and said distance measuring device to generate data indicative of the force applied by said movable assembly along said path of driving movement to said manually movable member as a function of distance during said predetermined simulated manual movement of said manually movable member along said path of driven movement through said predetermined range of movement.

2. An apparatus according to claim 1 wherein said distance measuring device comprises an encoder constructed and arranged to determine the distance traveled by said movable assembly, and hence said manually movable member, through said range of movement, said encoder generating electrical signals based on said distance traveled, said data processing system receiving said electrical signals generated by said encoder to enable said data processing system to generate data indicative of the force applied by said movable assembly to said manually movable member as a function of the distance traveled.

3. An apparatus according to claim 2, wherein said circuitry includes a transducer constructed and arranged to convert the force applied to said manually movable member by said movable assembly into electrical signals having voltages proportional to said force throughout said predetermined range of movement.

4. An apparatus according to claim 3, wherein said data processing system is electrically connected with said transducer and can be programmed to generate data until the force measured by said transducer reaches a predetermined value.

5. An apparatus according to claim 4, further comprising a switching mechanism electrically connected with said drive mechanism, said switching mechanism disabling said drive mechanism in response to a signal generated by said data processing system when the force measured by said transducer reaches said predetermined value.

6. An apparatus according to claim 1, wherein said data processing system is cooperable with said distance measuring device to generate data indicative of the force applied by said movable assembly to said manually movable member as a function of time.

7. An apparatus according to claim 3, wherein said data processing system includes a computer, a electrical chassis assembly interfaced with said computer and having signal conditioner and control logic circuitry, and a remote control box for controlling operation of said apparatus remotely from said movable assembly and said motor vehicle.

8. An apparatus according to claim 3, wherein said movable assembly has a force applied thereto generally equal and opposite the force applied to said manually movable member as a result of the engagement of the movable element with said manually movable member during movement of said manually movable member through said predetermined range of movement from a first position to a second position, and wherein said movable assembly continues to have said equal and opposite force applied thereto as a result of continuing engagement between said movable element and said manually movable member as said movable element is moved to return said manually movable member from said second position to said first position, said data processing system receiving signals from said encoder and said transducer to generate data indicative of the amount of force applied by said manually movable member to said movable assembly and the equal and opposite force applied by said movable assembly to said manually movable member as a function of the distance travelled by said manually movable member as it moves from said second position to said first position.

9. An apparatus according to claim 3, wherein said movable assembly is constructed and arranged to engage a manually movable member in the form of a motor vehicle door handle normally biased into an operative position, said movable assembly capable of being driven by said drive mechanism to apply a force to the manually movable vehicle door handle and move the door handle against the bias thereof from said operative position to an inoperative position, said data processing system receiving signals from said encoder and said transducer to generate data indicative of the amount of force applied by said movable assembly to said door handle against the bias of said door handle as a function of the distance travelled by said door handle as it is moved from said operative position to said inoperative position against the bias thereof.

10. An apparatus according to claim 9, wherein said movable assembly includes a fixed base fixed relative to said motor vehicle said movable element being mounted for movement with respect to said fixed base, said movable element constructed and arranged to engage said vehicle door handle throughout the range of movement of said door handle from said operative position to said inoperative position.

11. An apparatus according to claim 10, wherein said movable assembly is constructed and arranged such that said fixed base defines an arcuate path and said movable element is movable along said arcuate path to enable said movable element to movingly engage said vehicle door handle and to pivotally move said vehicle door handle about an axis of rotation from said operative position to said inoperative position.

12. An apparatus according to claim 11, wherein said fixed base has an arcuate surface generally defining said arcuate path, and wherein said drive mechanism comprises a motor constructed and arranged to drive said movable element along said arcuate path to enable said movable element to pivotally move said vehicle door handle about said axis of rotation thereof from said operative position to said inoperative position.

13. An apparatus according to claim 12, further comprising a mounting assembly for fixedly mounting said fixed base of said movable assembly relative to said motor vehicle, said mounting assembly being adjustable to enable said fixed base to be positioned such that an imaginary circle defined by said arcuate surface of said fixed base has a central axis normal to said circle generally disposed in co-axial relation with respect to the axis of rotation of said vehicle door handle, and wherein said movable element is adjustably mounted on said fixed base such that the distance between said movable element and said axis of rotation of said vehicle door handle can be adjusted according to the length of said door handle to enable said movable element to be adapted to engage vehicle door handles of different lengths.

14. An apparatus as claimed in claim 13, wherein said mounting assembly includes mounting elements adapted to be fixed at spaced locations on the exterior of a motor vehicle and at least one mounting arm connected with said mounting elements for mounting said movable assembly such that the central axis through said imaginary circle defined by the arcuate surface of said fixed base can be generally co-axially disposed with respect to the exterior door handle of a motor vehicle.

15. An apparatus as claimed in claim 13, wherein said mounting assembly includes mounting elements adapted to be fixed at spaced locations on interior portions of a motor vehicle and at least one mounting arm connected with said mounting elements for mounting said movable assembly in such fashion such that the central axis through said imaginary circle defined by the arcuate surface of said fixed base can be generally co-axially disposed with respect to the interior door handle of a motor vehicle.

16. An apparatus as claimed in claim 11, wherein said fixed base comprises a goniometric cradle.

17. An apparatus according to claim 9, wherein said movable assembly has a force applied thereto generally equal and opposite the force applied to said normally biased vehicle door handle as a result of the engagement of the movable element with said vehicle door handle during movement of said door handle from said operative position to said inoperative position, and wherein said movable assembly continues to have said equal and opposite force applied thereto as a result of continuing engagement between said movable assembly and said door handle during biased movement of said door handle from said inoperative position to said operative position, and said data processing system capable of receiving signals from said encoder and said transducer to generate data indicative of the amount of force applied by said door handle to said movable assembly and the equal and opposite force applied by said movable assembly to said door handle as of a function of the distance travelled by said door handle as it moves from said inoperative position to said operative position.

18. An apparatus as claimed in claim 3, wherein said movable assembly is constructed and arranged to engage a manually movable member in the form of a key capable of being inserted into an associated motor vehicle cylinder, said drive mechanism driving said movable assembly through said range of movement to move said key from said position in which the key is disposed substantially externally to the associated key cylinder to said position in which a substantial portion of said key is disposed internally to the associated key cylinder, said key being in frictional engagement with portions of said cylinder as said key is moved as aforesaid, said drive mechanism constructed and arranged to drive said movable assembly so that the movable assembly applies a force to said key against said frictional engagement to move said key as aforesaid, said data processing system constructed and arranged to receive signals from said encoder and said transducer to generate data indicative of the amount of force applied by said movable assembly to said key against the frictional engagement of said key with said associated cylinder as a function of the distance traveled by said key a it is moved from said position substantially externally of the associated key cylinder to said position in which a substantial portion of the key is disposed internally to the associated key cylinder.

19. An apparatus according to claim 18, wherein said movable assembly includes a fixed base fixed relative to said motor vehicle, and wherein said movable element is mounted for movement with respect to said fixed base, said movable element constructed and arranged to engage the key throughout the range of movement of the key, and wherein said drive mechanism comprises a motor constructed and arranged to drive said movable element to move said key from said position in which the key is disposed substantially externally to the associated key cylinder to said position in which a substantial portion of the key is disposed internally to the associated key cylinder.

20. An apparatus according to claim 19, further comprising a mounting assembly for fixedly mounting said fixed base of said movable assembly relative to said motor vehicle, said mounting assembly being adjustable to enable said mounting assembly to be positioned so that said movable element can maintain the key in general alignment with a key passage in the associated key cylinder when said key is disposed substantially externally to the associated key cylinder so that the key will be inserted into the key passage in the associated key cylinder when said motor drives said movable element to move the key to said position in which a substantial portion of the key is disposed internally to the associated key cylinder.

21. An apparatus as claimed in claim 20 wherein said mounting assembly includes mounting elements adapted to be fixed at spaced locations on the exterior of a motor vehicle to enable the movable element to maintain the key in general alignment with a key passage of an associated key cylinder in the form of a vehicle side door key cylinder, and at least one mounting arm connected between said mounting elements and said fixed base for fixedly mounting said fixed base relative to said side door key cylinder.

22. An apparatus as claimed in claim 20, wherein said movable element of said mounting assembly is constructed and arranged to be able to engage said key in such fashion as to permit limited movement of said key slightly out of alignment with said key passage as said key is moved against said frictional engagement with the associated key cylinder so as to simulate manual movement of said key during manual insertion of the key into the associated key cylinder.

23. An apparatus as claimed in claim 3, wherein said movable assembly is constructed and arranged to engage a manually movable member in the form of a key capable of being disposed within an associated motor vehicle key cylinder, said movable assembly capable of being driven by said drive mechanism to be able to rotatably move said key when said key is disposed within the associated key cylinder from a first position to a second position against a yieldable resistance of the associated key cylinder, said data processing system being constructed and arranged to receive signals from said encoder and said transducer to generate data indicative of the amount of force applied by said movable assembly to said key as a function of the distance travelled by said key as it is rotatably moved against the yieldable resistance of the associated key cylinder from the first position to the second position.

24. An apparatus according to claim 23, wherein said movable assembly includes a fixed based fixed relative to said motor vehicle, said movable element being mounted for rotatable movement with respect to said fixed base, said movable element constructed and arranged to engage said key throughout the range of rotatable movement of said key from said first position to said second position, against the yieldable resistance of the associated cylinder, and wherein said drive mechanism comprises a motor constructed and arranged to drive said movable element to rotatably move said key from said first position to said second position.

25. An apparatus according to claim 24, further comprising a mounting assembly for fixedly mounting said fixed base of said movable assembly relative to said motor vehicle as said movable element is rotatably driven by said motor.

26. An apparatus according to claim 24, wherein said mounting assembly includes mounting elements adapted to be fixed at spaced locations on the exterior of a motor vehicle to enable the movable element to be positioned to maintain the key within an associated key cylinder in the form of a vehicle side door key cylinder, and at least one mounting arm connected between said mounting elements and said fixed base for fixedly mounting said fixed base relative to said side door key cylinder.

27. An apparatus as claimed in claim 23, wherein said movable assembly has a force applied thereto generally equal and opposite the force applied to said key by said movable assembly as a result of the engagement between said key and said movable element during said movable assembly's movement of the key from the first position to the second position against the yieldable resistance of the associated key cylinder, and wherein said movable assembly continues to have said equal and opposite force applied thereto as a result of the continuing engagement between said movable assembly and said key when said key is moved by said movable assembly in an opposite direction also against a yieldable resistance of the associated key cylinder so as to be returned to said first position from said second position, said first and second positions of said key corresponding to unlocking and locking conditions of the associated cylinder, respectively, and said data processing system capable of receiving signals from said encoder and said transducer to generate data indicative of the amount of force applied by said key to said movable assembly and the equal and opposite force applied by the movable assembly to the key as a function of the distance travelled by the key as the key is moved by said movable assembly against the yieldable resistance of the associated key cylinder from the first position in which the associated key cylinder is disposed in an unlocking condition to the second position in which the associated key cylinder is disposed in a locking condition and as the key is moved by said movable assembly from the second position back to the first position against the yieldable resistance of the associated key cylinder to return the associated key cylinder to the unlocking condition.

28. An apparatus as claimed in claim 3, wherein said movable assembly is constructed and arranged to engage a manually movable member in the form of a motor vehicle inside door lock knob, said movable assembly capable of being driven by said drive mechanism to be able to move the lock knob from a first position to a second position against a yieldable resistance of said lock knob, said data processing system being constructed and arranged to receive signals from said encoder and said transducer to generate data indicative of the amount of force applied by said movable assembly to said lock knob as a function of the distance travelled by said lock knob as said lock knob is moved by said movable assembly against the yieldable resistance of the lock knob from the first position to the second position.

29. An apparatus according to claim 28, wherein said movable assembly includes a fixed base fixed relative to said motor vehicle, said movable element being mounted for movement with respect to said fixed base, said movable element constructed and arranged to be able to engage said lock knob throughout the range of movement of said lock knob from said first position to said second position against the yieldable resistance of said lock knob, and wherein said drive mechanism comprises a motor constructed and arranged to drive said movable element to move said lock knob from said first position to said second position.

30. An apparatus according to claim 29, further comprising a mounting assembly for fixedly mounting said fixed base of said movable assembly relative to said motor vehicle as said movable element is driven by said motor.

31. An apparatus according to claim 29, wherein said mounting assembly includes mounting elements adapted to be fixed at spaced locations within the interior of the motor vehicle, and at least one mounting arm connected between said mounting elements and said fixed base for fixedly mounting said fixed base relative to said lock knob.

32. An apparatus as claimed in claim 28, wherein said movable assembly has a force applied thereto generally equal and opposite the force applied to said lock knob by said movable assembly as a result of the engagement between said lock knob and said movable element during said movable assembly's movement of the lock knob from the first position to the second position against the yieldable resistance of the lock knob, and wherein said movable assembly continues to have said equal and opposite force applied thereto as a result of the continuing engagement between said movable element and said lock knob when said lock knob is moved by said movable assembly in an opposite direction against a yieldable resistance of said lock knob so as to be returned to said first position from said second position, said first and second positions of said key corresponding to unlocking and locking conditions of the associated vehicle door lock, respectively, and said data processing system capable of receiving signals from said encoder and said transducer to generate data indicative of the amount of force applied by said lock knob to said movable assembly and the equal and opposite force applied by the movable assembly to the lock knob as a function of the distance travelled by the lock knob as the lock knob is moved by said movable assembly against the yieldable resistance of said lock knob from the first position in which the associated vehicle door lock is disposed in an unlocking condition to the second position in which the associated vehicle door lock is disposed in a locking condition and as the lock knob is moved by said movable assembly from the second position back to the first position against the yieldable resistance of the lock knob to return the associated vehicle door lock to the unlocking condition.

33. An apparatus as claimed in claim 3, wherein said movable assembly is constructed and arranged to engage a manually movable member in the form of a rotatable vehicle window handle, said movable assembly capable of being driven by said drive mechanism to be able to rotatably move the window handle through said predetermined range of movement in a predetermined direction against a yieldable resistance of said window handle, said data processing system being constructed and arranged to receive signals from said encoder and said transducer to generate data indicative of the amount of force applied by said movable assembly to said window handle as a function of the distance travelled by said window handle as said window handle is moved by said movable assembly in said predetermined direction against the yieldable resistance of the window handle.

34. An apparatus according to claim 33, wherein said movable assembly includes a fixed base fixed relative to said motor vehicle, said movable element being mounted for rotatable movement with respect to said fixed base, said movable element constructed and arranged to be able to engage said window handle throughout said predetermined range of movement in said predetermined direction against the yieldable resistance of said window handle, and wherein said drive mechanism comprises a motor constructed and arranged to drive said movable element to rotatably move said window handle through said predetermined range of movement in said predetermined direction.

35. An apparatus according to claim 34, further comprising a mounting assembly for fixedly mounting said fixed base of said movable assembly relative to said motor vehicle as said movable element is driven by said motor.

36. An apparatus according to claim 34, wherein said mounting assembly includes mounting elements adapted to be fixed at spaced locations within the interior of the motor vehicle, and at least one mounting arm connected between said mounting elements and said fixed base for fixedly mounting said fixed base relative to said window handle.

37. An apparatus according to claim 33, wherein said movable assembly has a force applied thereto generally equal and opposite the force applied to said window handle by said movable assembly as a result of the engagement between said window handle and said movable element during said movable assembly's rotatable movement of the window handle through said predetermined range of movement in said predetermined direction against the yieldable resistance of the window handle, and wherein said movable assembly continues to have said equal and opposite force applied thereto as a result of continuing engagement between said movable assembly and said window handle when said window handle is rotatably moved by said movable assembly in an opposite direction to said predetermined direction against a yieldable resistance of said window handle so as to rotatably move the window handle through an opposite predetermined range of movement, said predetermined direction of handle movement corresponding to a direction which effectuates raising of an associated vehicle window and said opposite direction of handle movement corresponding to a direction which effectuates lowering of the associated vehicle window, and said data processing system capable of receiving signals from said encoder and said transducer to generate data indicative of the amount of force applied by said window handle to said movable assembly and the equal and opposite force applied by the movable assembly to the window handle as a function of the distance travelled by the window handle as the window handle is moved by said movable assembly against the yieldable resistance of said window handle through said predetermined range of movement in said predetermined direction to effectuate raising of the associated vehicle window and as the window handle is moved by said movable assembly against the yieldable resistance of said window handle through said opposite predetermined range of movement in said opposite direction to effectuate lowering of the associated vehicle window.

38. An apparatus according to claim 3, wherein said movable assembly is constructed and arranged to engage a manually movable member in the form of a motor vehicle door, said movable assembly capable of being driven by said drive mechanism to move the vehicle door through said predetermined range of movement from a first position to a second position against a yieldable resistance of the vehicle door, said data processing system being constructed and arranged to receive signals from said encoder and said transducer to generate data indicative of the amount of force applied by said movable assembly to said vehicle door as a function of the distance travelled by said vehicle door as said vehicle door is moved by said movable assembly through said predetermined range of movement against the yieldable resistance of the vehicle door.

39. An apparatus according to claim 38, wherein said movable assembly includes a fixed base fixed relative to said motor vehicle, said movable element being mounted for movement with respect to said fixed base, said movable element constructed and arranged to be able to engage said vehicle door throughout said predetermined range of movement against the yieldable resistance of said vehicle door, and wherein said drive mechanism comprises a motor constructed and arranged to drive said movable element to move said vehicle door through said predetermined range of movement.

40. An apparatus according to claim 39, further comprising a mounting assembly for fixedly mounting said fixed base of said movable assembly relative to said motor vehicle as said movable element is driven by said motor.

41. An apparatus according to claim 39, wherein said mounting assembly is constructed and arranged to be fixedly mounted to a rigid structure adjacent the motor vehicle to enable said fixed base of the mounting assembly to be fixedly mounted relative to said motor vehicle as said movable element is driven by said motor.

42. An apparatus according to claim 38, wherein said encoder is in the form of a linear encoder constructed and arranged to determine the linear distance travelled by said vehicle door through said predetermined range of movement from a first position in which the vehicle door is slightly ajar to a second position in which the vehicle door is completely closed with respect to the associated door opening.

43. An apparatus according to claim 38, wherein said encoder is in the form of an angular encoder constructed and arranged to determine the distance travelled by said vehicle door through said predetermined range of movement from a first position in which the vehicle door is substantially opened wide with respect to the associated door opening to a second position in which the vehicle door has been moved closer to the associated door opening.

44. A method for acquiring data relating to an amount of force utilized in moving a manually movable member operatively associated with a motor vehicle throughout a predetermined range of normal manual movement of said manually movable member, said manually movable member having a manually engageable portion constructed and arranged to be moved along a path of driven movement having a predetermined configuration, said method comprising:

engaging said manually movable member and applying a driving force thereto along a path of driving movement through said range of normal manual movement, said path of driving movement having substantially the same configuration as said predetermined configuration of said path of driven movement;

moving said manually movable member through said predetermined range of normal manual movement and along said path of driven movement having said predetermined configuration as a result of said driving force applied to said manually movable member along said path of driving movement having said substantially same configuration as said path of driven movement so as to generally simulate a predetermined manual movement of said manually moveable member;

generating electrical signals based upon a distance traveled by said manually movable member;

generating a progression of electrical signals based on an amount of said driving force applied to said manually movable member in moving said manually movable member through said predetermined range of normal manual movement along said path of driven movement; and processing said electrical signals based upon said distance traveled and said force applied to derive data indicative of the amount of force applied as a function of the distance traveled in moving said manually movable member throughout said predetermined range of normal manual movement along said path of driven movement.

45. The method according to claim 44, wherein said moving step further comprises the step of operating a motor to mechanically drive said manually movable member through said predetermined range of normal manual movement.

46. The method according to claim 45, further comprising the step of inputting data corresponding to a predetermined force value, and terminating operation of said motor when the amount of force applied by said movable assembly to said manually movable member reaches said predetermined force value.

47. An apparatus for acquiring data relating to an amount of force required to move a motor vehicle door through a predetermined range of movement comprising:

a movable assembly constructed and arranged to be able to engage said door at an at least partially opened positioned and maintain said engagement through said predetermined range of movement, and thereafter release said door prior to said door reaching a closed position;

a drive mechanism constructed and arranged to drive said movable assembly so that said movable assembly applies a force to said door through said predetermined range of movement so as to generally simulate a manually generated movement of said door from said at least partially opened position to said closed position;

circuitry operatively connected with said movable assembly for generating electrical signals indicative of the force applied to said door by said movable assembly through said predetermined range of movement during said predetermined simulated manual generated movement of said door;

a data processing system responsive to said electrical signals generated by said circuitry for generating data indicative of the force applied by said movable assembly to said door through said predetermined range of movement during said predetermined simulated manually generated movement of said door.

48. An apparatus for acquiring data relating to an amount of force required to move a key cable of being disposed within an associated motor vehicle key cylinder through a predetermined range of rotational movement comprising:

a movable assembly constructed and arranged to be able to engage said key through said predetermined range of rotational movement of said key;

a drive mechanism constructed and arranged to drive said movable assembly so that said movable assembly rotatably moves said key through said predetermined range of rotational movement when said key is disposed within the associated key cylinder against a yieldable resistance of the associated key cylinder so as to generally simulate a predetermined manual rotational movement of said key within said cylinder;

circuitry operatively connected with said movable assembly for generating electrical signals indicative of the force applied to said manually movable member by said movable assembly during said predetermined simulated manual movement of said manually movable member through said predetermined range of movement;

a data processing system responsive to said electrical signals generated by said circuitry for generating data indicative of the force applied by said movable assembly to said key during said predetermined simulated manual rotational movement of said key through said predetermined range of rotational movement.

49. An apparatus for acquiring data relating to an amount of force required to move a key cable of being inserted into an associated motor vehicle key cylinder through a predetermined range of movement from a position in which the key is disposed substantially externally to the associated key cylinder to a position in which a substantial portion of said key is disposed internally to the associated key cylinder, said apparatus comprising:

a movable assembly constructed and arranged to be able to engage said key through said predetermined range of movement;

a drive mechanism constructed and arranged to drive said movable assembly so that said movable assembly moves said key through said predetermined range of movement so as to generally simulate a predetermined manual movement of said key;

said drive mechanism driving said movable assembly through said range of movement to move said key from said position in which the key is disposed substantially externally to the associated key cylinder to said position in which said substantial portion of said key is disposed internally to the associated key cylinder, said key being in frictional engagement with portions of said cylinder as said key is moved as aforesaid, said drive mechanism constructed and arranged to drive said movable assembly so that the movable assembly applies a force to said key against said frictional engagement to move said key as aforesaid, circuitry operatively connected with said movable assembly for generating electrical signals indicative of the force applied to said key by said movable assembly during said predetermined simulated manual movement of said key through said predetermined range of movement;

a data processing system responsive to said electrical signals generated by said circuitry for generating data indicative of the force applied by said movable assembly to said key during said predetermined simulated manual movement of said key through said predetermined range of movement.

50. An apparatus for acquiring data relating to an amount of force required to move a manually movable door handle for a motor vehicle through a predetermined range of pivoted movement, said door handle being biased into an operative position wherein an associated motor vehicle door is in a locking condition and being movable through said range of pivoted movement against said bias into an inoperative position wherein said associated motor vehicle door is in an unlocking condition, said apparatus comprising:

a movable assembly having a movable element constructed and arranged to engage said door handle through said predetermined range of pivoted movement of said door handle;

a drive mechanism constructed and arranged to drive said movable element along an arcuate path so that said movable assembly applies a force to said door handle and moves said door handle through said predetermined range of pivoted movement so as to generally simulate a predetermined manual movement of said door handle;

circuitry operatively connected with said movable assembly for generating electrical signals indicative of the force applied to said door handle by said movable assembly during said predetermined simulated manual movement of said door handle through said predetermined range of movement;

a data processing system responsive to said electrical signals generated by said circuitry for generating data indicative of the force applied by said movable assembly to said door handle through said predetermined range of pivoted movement.

51. An apparatus for acquiring data relating to an amount of force required to move a motor vehicle inside door lock knob between a locking position which locks a motor vehicle door and an unlocking position which unlocks the motor vehicle door, said locking and unlocking positions defining a predetermined range of movement, said apparatus comprising:

a movable assembly constructed and arranged to be able to engage said lock knob through said predetermined range of movement of said lock knob;

a drive mechanism constructed and arranged to drive said movable assembly so that said movable assembly applies a force to said lock knob and moves said lock knob against a yieldable resistance through said predetermined range of movement so as to generally simulate a predetermined manual movement of said lock knob;

circuitry operatively connected with said movable assembly for generating electrical signals indicative of the force applied to said lock knob by said movable assembly during said predetermined simulated manual movement of said lock knob through said predetermined range of movement;

a data processing system responsive to said electrical signals generated by said circuitry for generating data indicative of the force applied by said movable assembly to said lock knob during said predetermined simulated manual movement of said lock knob through said predetermined range of movement.

52. An apparatus for acquiring data relating to an amount of force required to move a rotatable window handle operatively associated with a window for a motor vehicle through a predetermined range of rotational movement comprising:

a movable assembly constructed and arranged to be able to engage said window handle through said predetermined range of rotational movement;

a drive mechanism constructed and arranged to rotatably drive said movable assembly so that said movable assembly rotatably moves said window handle through said predetermined range of rotational movement so as to generally simulate a predetermined manual rotational movement of said window handle;

circuitry operatively connected with said movable assembly for generating electrical signals indicative of the force applied to said manually movable member by said movable assembly during said predetermined simulated manual rotational movement of said manually movable member through said predetermined range of rotational movement;

a data processing system responsive to said electrical signals generated by said circuitry for generating data indicative of the force applied by said movable assembly to said window handle during said predetermined simulated manual rotational movement of said window handle through said predetermined range of rotational movement.

* * * * *